US012756510B2

(12) United States Patent
Noh et al.

(10) Patent No.: US 12,756,510 B2
(45) **Date of Patent: *Oct. 6, 2026**

(54) MIDAMBLE OPERATION IN A WIRELESS LOCAL AREA NETWORK

(71) Applicant: Avalon Technology Solutions LLC, Frisco, TX (US)

(72) Inventors: Sichan Noh, Seoul (KR); Yujin Noh, Irvine, CA (US); Jong-ee Oh, Irvine, CA (US); Min Seoung Kim, Irvine, CA (US); Dae Kyun Lee, Irvine, CA (US); Youngjae Jung, Seoul (KR); Hyobin Yim, Seoul (KR)

(73) Assignee: Avalon Technology Solutions LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/794,117

(22) Filed: Aug. 5, 2024

(65) Prior Publication Data

US 2024/0396679 A1 Nov. 28, 2024

Related U.S. Application Data

(63) Continuation of application No. 17/808,082, filed on Jun. 21, 2022, now abandoned, which is a (Continued)

(51) Int. Cl.
*H04L 5/00* (2006.01)
*H04L 1/00* (2006.01)
(Continued)

(52) U.S. Cl.
CPC .......... *H04L 5/0044* (2013.01); *H04L 1/0003* (2013.01); *H04L 1/0023* (2013.01);
(Continued)

(58) Field of Classification Search
CPC ... H04L 5/0044; H04L 1/0003; H04L 1/0023; H04L 5/0007; H04L 5/0042;
(Continued)

(56) References Cited

U.S. PATENT DOCUMENTS 9,628,310 B2 * 4/2017 Lee ..................... H04L 27/2613
2011/0205997 A1 * 8/2011 Chun .................... H04W 72/20
370/329

(Continued)

FOREIGN PATENT DOCUMENTS

CN 201810910307.3 * 8/2018 .......... H04W 72/042
KR 1020190051162 * 5/2019 ............. H04L 27/26

*Primary Examiner* — Ian N Moore
*Assistant Examiner* — Latresa A Mccallum
(74) *Attorney, Agent, or Firm* — Nutter McClennen & Fish LLP

(57) ABSTRACT

A method is described for generating and transmitting a frame by a station (STA). The method includes determining a bandwidth of a frame to be transmitted by the STA, generating a long training field for the frame, the long training field including a set of pilot tones located at a set of subcarrier positions, and transmitting the frame with the long training field to a recipient. In response to the bandwidth of the frame is 10 MHz, the set of subcarrier positions includes four subcarrier positions. In response to the bandwidth of the frame is 20 MHz, the set of subcarrier positions includes six subcarrier positions.

45 Claims, 15 Drawing Sheets

Related U.S. Application Data continuation of application No. 16/925,613, filed on Jul. 10, 2020, now Pat. No. 11,398,886.

(60) Provisional application No. 62/897,073, filed on Sep. 6, 2019, provisional application No. 62/877,742, filed on Jul. 23, 2019, provisional application No. 62/875,301, filed on Jul. 17, 2019, provisional application No. 62/873,560, filed on Jul. 12, 2019.

(51) Int. Cl.
*H04W 84/12* (2009.01)
*H04W 88/02* (2009.01)

(52) U.S. Cl.
CPC .......... *H04L 5/0007* (2013.01); *H04L 5/0042* (2013.01); *H04W 84/12* (2013.01); *H04W 88/02* (2013.01)

(58) Field of Classification Search
CPC ... H04L 5/0048; H04L 1/0618; H04L 1/1819; H04L 1/1825; H04W 84/12; H04W 88/02
See application file for complete search history.

(56) References Cited

U.S. PATENT DOCUMENTS

| | | | | |
|---|---|---|---|---|
| 2019/0182095 | A1* | 6/2019 | Suh | H04L 1/0058 |
| 2020/0044699 | A1* | 2/2020 | Park | H04L 27/26 |
| 2021/0168773 | A1* | 6/2021 | Jia | H04L 27/0006 |
| 2021/0344540 | A1* | 11/2021 | Park | H04L 27/2603 |
| 2022/0224381 | A1* | 7/2022 | Yun | H04B 7/063 |
| 2022/0271980 | A1* | 8/2022 | Lim | H04L 27/26132 |

* cited by examiner

700

| ELEMENT/FIELD | DEFINITION 702 | DURATION 704 | DFT PERIOD 706 | GUARD INTERVAL (GI) 708 | SUBCARRIER SPACING 710 | DESCRIPTION 712 |
|---|---|---|---|---|---|---|
| LEGACY-SHORT TRAINING FIELD (L-STF) 714 | NON-HIGH THROUGHPUT(HT) SHORT TRAINING FIELD (STF) | 16 μs | - | - | | - |
| LEGACY-LONG TRAINING FIELD (L-LTF) 716 | NON-HT LONG TRAINING FIELD (LTF) | 16 μs | 6.4 μs | 3.2 μs | 156.25 kHZ | - |
| LEGACY-SIGNAL FIELD (L-SIG) 718 | NON-HT SIGNAL FIELD | 8 μs | 6.4 μs | 1.6 μs | 156.25 kHZ | - |
| DATA 720 | HIGH EFFICIENCY (HE) DATA FIELD | $N_{DATA}$ * (DFT PERIOD +GI) μs | 6.4 μs | 1.6 μs | 156.25 kHZ | $N_{DATA}$ IS THE NUMBER OF 802.11P DATA SYMBOLS |

FIG. 7

800

| Parameter | 20 MHz Channel (11a) | 10 MHz Channel (11p) |
|---|---|---|
| $N_{SD}$: Number of data subcarriers | 48 | 48 |
| $N_{DP}$: Number of pilot subcarriers | 4 | 4 |
| $N_{ST}$: Number of subcarriers, total | 52 ($N_{SD}+N_{SP}$) | 52 ($N_{SD}+N_{SP}$) |
| $\Delta_F$: Subcarrier frequency spacing | 0.3125 MHz | 0.15625 MHz |
| $T_{FFT}$: IFFT/FFT period | 3.2 μs ($1/\Delta_F$) | 6.4 μs ($1/\Delta_F$) |
| $T_{PREAMBLE}$: PHY Preamble duration | 16 μs ($T_{SHORT}+T_{LONG}$) | 32 μs ($T_{SHORT}+T_{LONG}$) |
| $T_{SIGNAL}$: Duration of the SIGNAL BPSK-OFDM symbol | 4 μs ($T_{GI}+T_{FFT}$) | 8 μs ($T_{GI}+T_{FFT}$) |
| $T_{GI}$: Guard Interval (GI) duration | 0.8 μs ($T_{FFT}/4$) | 1.6 μs ($T_{FFT}/4$) |
| $T_{GI2}$: Training Symbol GI duration | 1.6 μs ($T_{FFT}/2$) | 3.2 μs ($T_{FFT}/2$) |
| $T_{SYM}$: Symbol Interval | 4 μs ($T_{GI}+T_{FFT}$) | 8 μs ($T_{GI}+T_{FFT}$) |
| $T_{SHORT}$: Short Training Sequence duration | 8 μs ($10 \times T_{FFT}/4$) | 16 μs ($10 \times T_{FFT}/4$) |
| $T_{LONG}$: Long Training Sequence duration | 8 μs ($T_{GI2}+2\times T_{FFT}$) | 16 μs ($T_{GI2}+2\times T_{FFT}$) |

FIG. 8

900

| ELEMENT/FIELD | DEFINITION 902 | DURATION 904 | DFT PERIOD 906 | GUARD INTERVAL (GI) 908 | SUBCARRIER SPACING 910 |
|---|---|---|---|---|---|
| LEGACY-SHORT TRAINING FIELD (L-STF) 912 | NON-HIGH THROUGHPUT(HT) SHORT TRAINING FIELD (STF) | 8 μs | - | - | equivalent to 1,250 kHz |
| LEGACY-LONG TRAINING FIELD (L-LTF) 914 | NON-HT LONG TRAINING FIELD (LTF) | 8 μs | 3.2 μs | 1.6 μs | 312.5 kHz |
| LEGACY-SIGNAL FIELD (L-SIG) 916 | NON-HT SIGNAL FIELD | 4 μs | 3.2 μs | 0.8 μs | 312.5 kHz |
| RL-SIG FIELD 918 | REPEATED NON-HT SIGNAL FIELD | 4 μs | 3.2 μs | 0.8 μs | 312.5 kHz |
| U-SIG FIELD 920 | UNIVERSAL SIGNAL FIELD | $N_{USIG}$ * 4 μs | 3.2 μs | 0.8 μs | 312.5 kHz |
| EHT-SIG FIELD 922 | EHT SIGNAL FIELD | $N_{EHESIG}$ * 4 μs | 3.2 μs | 0.8 μs | 312.5 kHz |
| EHT-HARQ FIELD 924 | EHT HARQ FIELD | - | - | - | - |
| EHT-STF 926 | EHT SHORT TRAINING FIELD | - | - | - | - |
| EHT-LTF 928 | EHT LONG TRAINING FIELD | $N_{EHTLTF}$ * (DTF period + GI) μs | 2xLTF: 6.4 μs 4xLTF: 12.8 μs | 0.8, 1.6, or 3.2 μs | 2xLTF: (equivalent to) 156.25 kHz; 4xLTF: 78.125 kHz |
| EHT-DATA FIELD 930 | EHT DATA FIELD | $N_{DATA}$ * (DTF period + GI) μs | 12.8 μs | 0.8, 1.6, or 3.2 μs | 78.125 kHz |
| EHT-MA FIELD 932 | EHT MIDAMBLE FIELD | - | - | - | - |

FIG. 9

MIDAMBLE OPERATION IN A WIRELESS LOCAL AREA NETWORK

CROSS-REFERENCE TO RELATED APPLICATION

This application is a continuation of U.S. patent application Ser. No. 17/808,082, filed Jun. 21, 2022, which is a continuation of U.S. patent application Ser. No. 16/925,613, filed Jul. 10, 2020, now U.S. Pat. No. 11,398,886, which claims the benefit of U.S. Provisional Patent Application No. 62/897,073, filed Sep. 6, 2019, U.S. Provisional Patent Application No. 62/877,742, filed Jul. 23, 2019, U.S. Provisional Patent Application No. 62/875,301, filed Jul. 17, 2019, and U.S. Provisional Patent Application No. 62/873,560, filed Jul. 12, 2019, each of which are incorporated by reference herein in their entirety.

TECHNICAL FIELD

The present disclosure generally relates to wireless communications, and more specifically, relates to a midamble for a frame in a wireless transmission.

BACKGROUND

Vehicle to Everything (V2X) is a Direct Short Range Communication (DSRC) wireless technology, which is based on one or more of the Institute of Electrical and Electronics Engineers (IEEE) 802.11p standard, the IEEE 1609 Wireless Access in Vehicular Environment (WAVE) protocol in the U.S., and a European Telecommunications Standards Institute (ETSI) Technical Committee for Intelligent Transport Systems (TC ITS) standard. Devices equipped with V2X technology and applications should work well in rapidly varying communication environments. For example, V2X use cases often involve V2X applications that operate at speeds up to a minimum of 200 km/h for a communication range up to 1 km. The IEEE 802.11p specification supports an Orthogonal Frequency-Division Multiplexing (OFDM) technique with 64 subcarriers.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 7 shows a table that describes fields of a frame format, in accordance with some embodiments of the present disclosure.

FIG. 8 shows a table that includes additional timing parameters to provide a comparison between 20 MHz channel spacing in an IEEE 802.11a network and 10 MHz channel spacing in an IEEE 802.11p network, in accordance with some embodiments of the present disclosure.

FIG. 9 shows a table that describes fields of a frame format, in accordance with some embodiments of the present disclosure.

DETAILED DESCRIPTION

Figure 1:
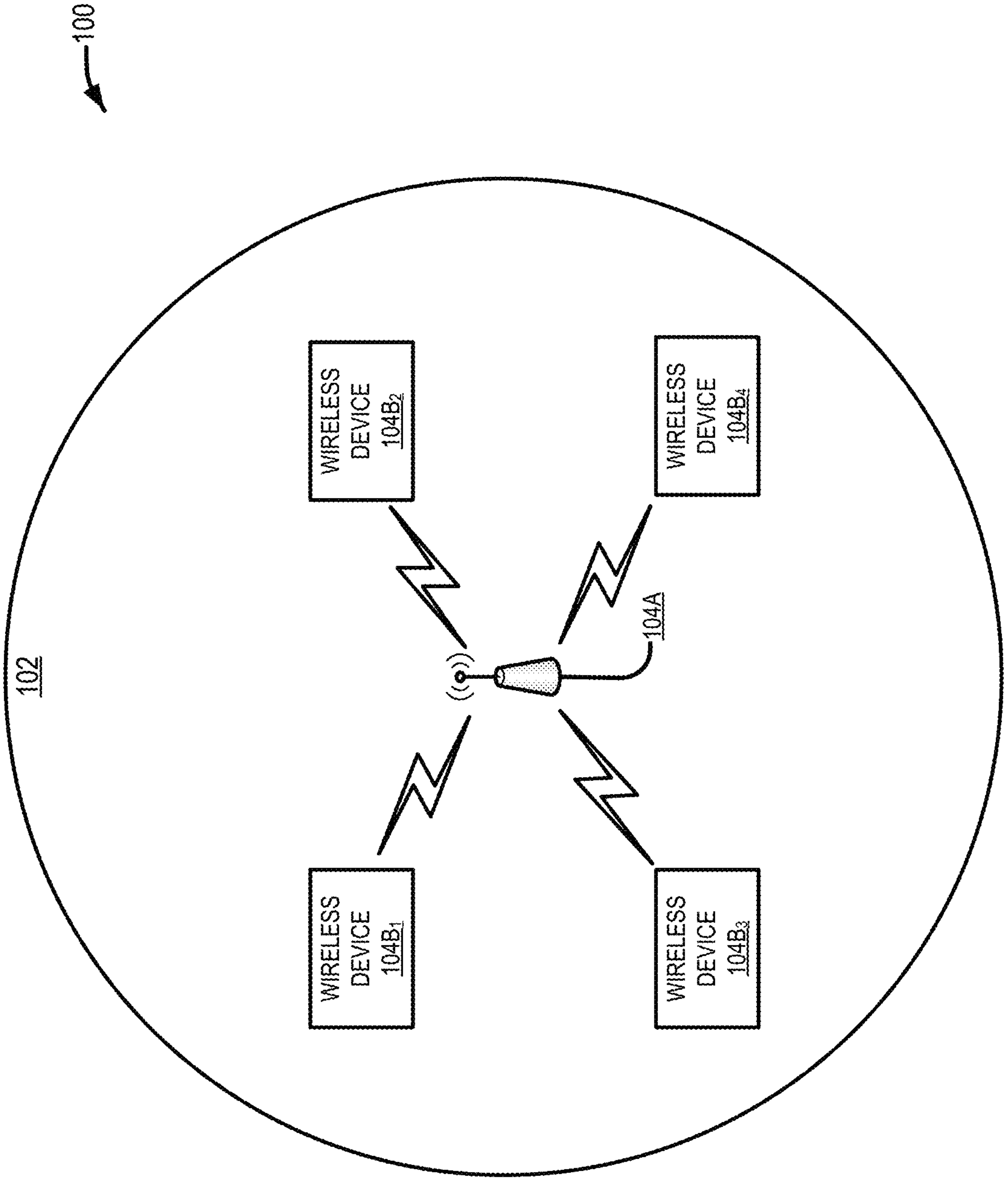
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to midamble operation in a wireless transmission.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices $\mathbf{104}B_1$-$\mathbf{104}B_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices $\mathbf{104}B_1$-$\mathbf{104}B_4$) may be collectively referred to as STAs. However, for ease of description, only the non-AP STAs may be referred to as STAs. Although shown with four non-AP STAs (e.g., the wireless devices $\mathbf{104}B_1$-$\mathbf{104}B_4$), the WLAN 100 may include any number of non-AP STAs (e.g., one or more wireless devices 104B).

Figure 2:
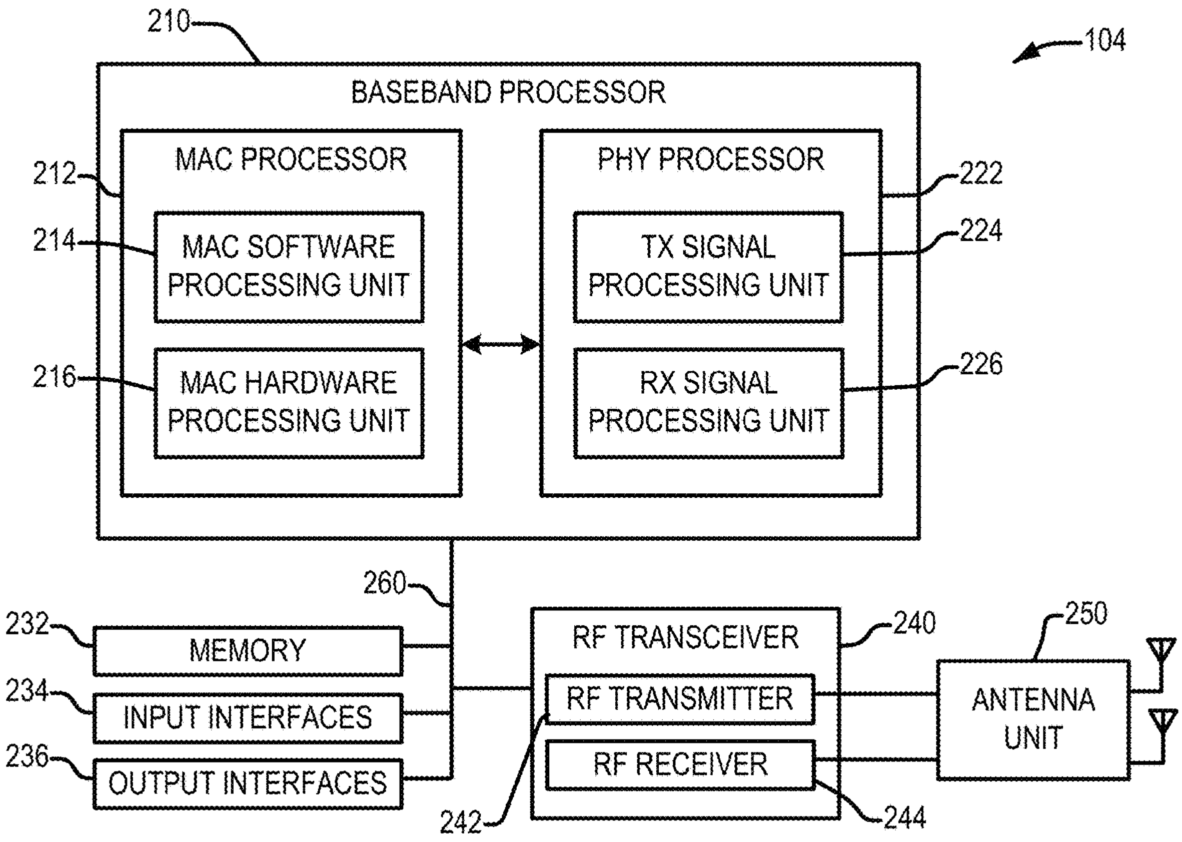
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices $\mathbf{104}B_1$-$\mathbf{104}B_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
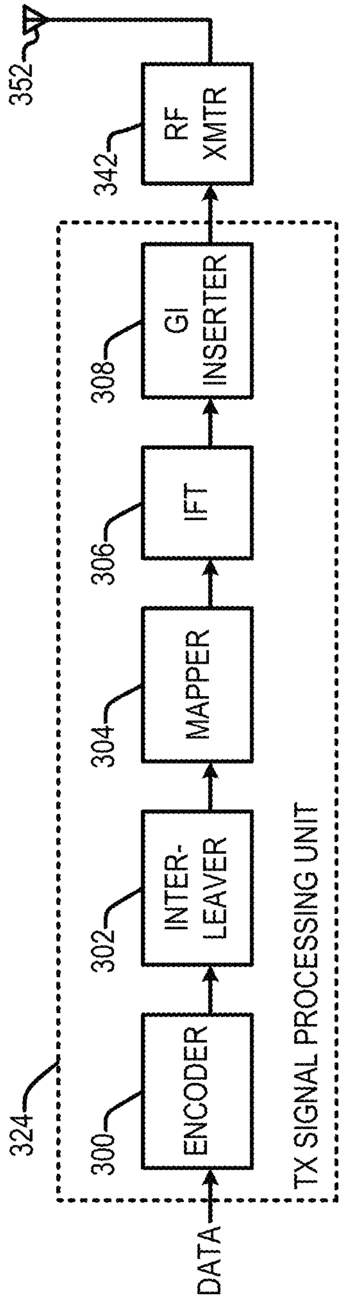
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
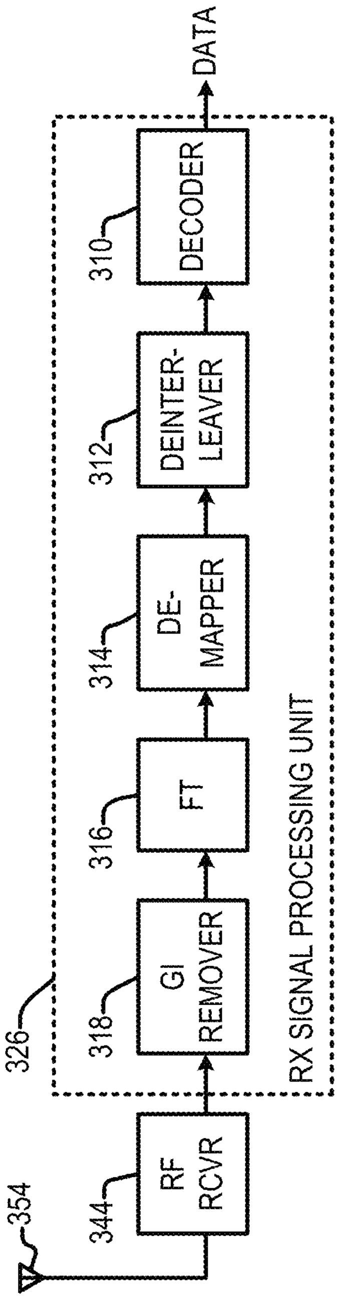
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, and 160 MHz contiguous channel widths and support for an 80+80 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
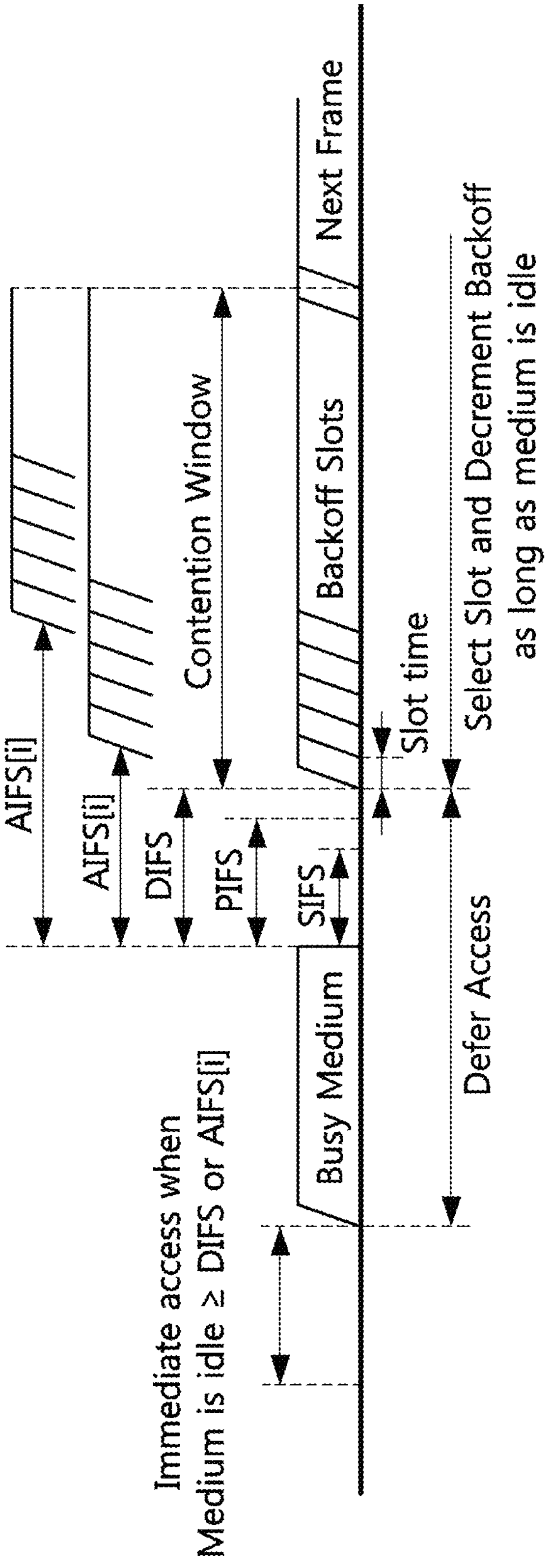
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS [i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QOS) functionality (that is, a QoS STA) may transmit the frame after performing backoff if an AIFS for an associated access category (AC) (i.e., AIFS [AC]) has elapsed. When transmitted by the QoS STA, any of the data frame, the management frame, and the control frame, which is not the response frame, may use the AIFS [AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
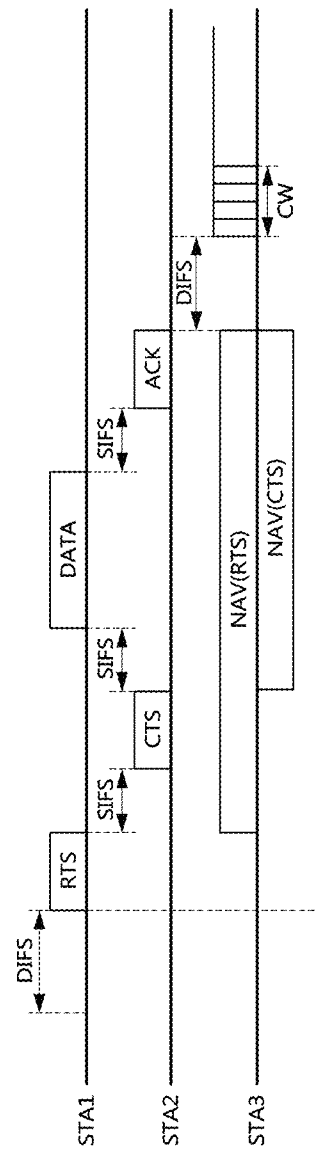
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

Figure 6:
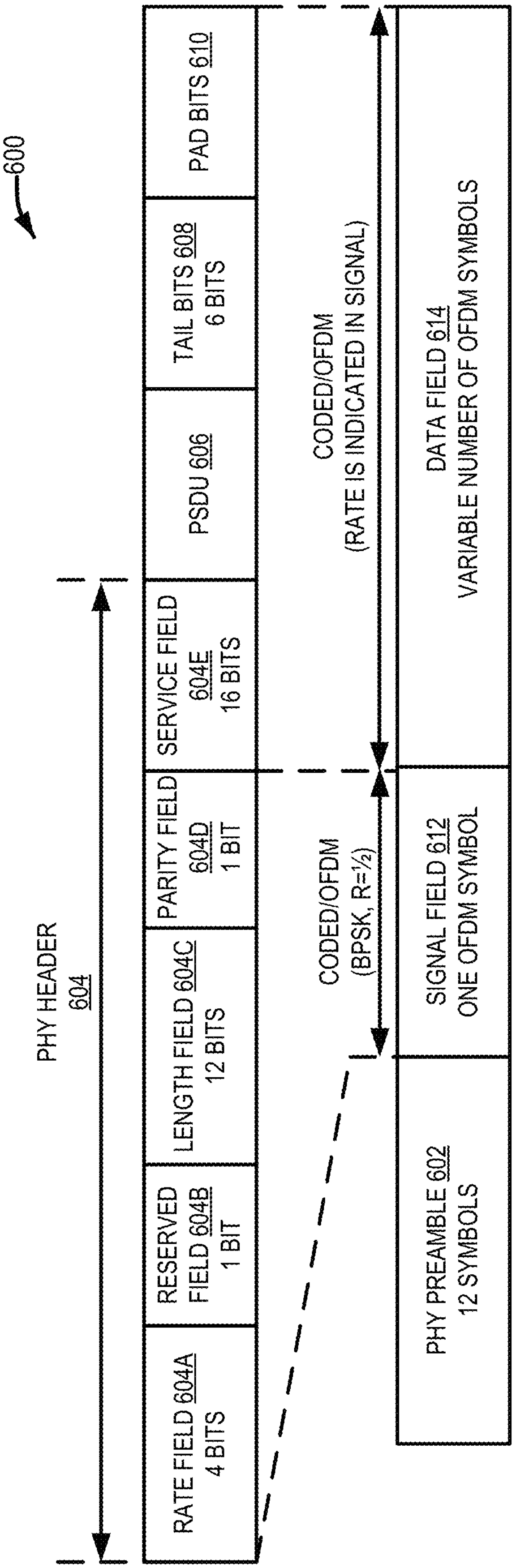
FIG. 6 shows a frame format for wireless communications, in accordance with some embodiments of the present disclosure.

Turning to FIG. 6, a frame format 600 is presented, according to one example embodiment. In some embodiments, the frame format 600 may be used in an IEEE 802.11p network. Namely, the frame format 600 may be used as a physical (PHY) frame format for communications in an IEEE 802.11p network. In particular, a transmitting STA may generate a PHY/PPDU frame using the frame format 600 and transmits the PPDU to a receiving STA. The receiving STA receives, detects, and processes the PPDU frame. As shown in FIG. 6, the frame format 600 includes a PHY preamble 602 (sometimes referred to as an OFDM Physical Layer Convergence Protocol (PLCP) preamble 602), a PHY header 604 (sometimes referred to as a PLCP header 604), a PLCP Service Data Unit (PSDU) 606, tail bits 608, and pad bits 610. As also shown, the PHY header 604 may include a rate field 604A of four bits, a reserved field 604B of one bit, a length field 604C of twelve bits, a parity field 604D of one bit, and a service field 604E of 16 bits. Each of the rate field 604A, reserved field 604B, length field 604C, and parity field 604D may be included in a signal field 612 that is one OFDM symbol.

In one embodiment, the PHY preamble 602 includes a legacy-short training field (L-STF) that consists of ten symbols and a legacy-long-training field (L-LTF) that consists of two symbols. In terms of modulation, the rate field 604A, reserved field 604B, length field 604C, and parity field 604D (with six tail and pad bits with a value of zero) constitute a separate single OFDM symbol (i.e., the signal field 612), which is transmitted with the most robust combination of binary phase shift keying (BPSK) modulation and a coding rate of R=1/2. The service field 604E of the PHY header 604 and the PSDU 606 (with six tail and pad bits with a value of zero) (i.e., the data field 614) are transmitted at the data rate described in the rate field 604A and may constitute multiple OFDM symbols. The tail bits in the signal field 612 enable decoding of the rate field 604A and the length field 604C immediately after the reception of the tail bits.

FIG. 7 includes a table 700, which describes fields of the frame format 600. In particular, the table 700 may describe various fields that may be within the PHY preamble 602 of the frame format 600. For example, the table 700 includes definitions 702, durations 704, Discrete Fourier transform (DFTs) periods 706, guard intervals (GIs) 708, subcarrier spacings 710, and a description 712 for one or more of a legacy short training field (L-STF) 714, legacy long training field (L-LTF) 716, legacy signal field (L-SIG) 718, and data field 720. FIG. 8 presents a table 800 that includes additional timing parameters to provide a comparison between 20 MHz channel spacing in an IEEE 802.11a network and 10 MHz channel spacing in an IEEE 802.11p network.

Considering demanding use cases that touch different environments, networks based on IEEE 802.11p may not be good enough to adequately deliver Direct Short-Range Communications (DSRCs). Further features that may be provided in relation to IEEE 802.11p include advanced coding, varying symbol duration, different guard intervals (GIs), higher data rates, and techniques to deal with high Doppler environments. These features may be included in the successor or an improvement to IEEE 802.11p, which may be developed by or in conjunction with the IEEE 802.11bd (e.g., Next Generation vehicle-to-X (V2X) (NGV)) working group.

Further, there is a clear sign that demand for higher peak through/capacity in wireless networks is growing. Considering IEEE 802.11b through IEEE 802.11ac, the peak PHY rate has increased by 5× or 11×. In the case of IEEE 802.11ax, the working group focused on improving efficiency, not peak PHY rate in dense environments. To meet demand of wireless network traffic growth, the peak PHY rate may need to be increased.

Looking at operational bands 2.4/5/6 GHz in IEEE 802.11be (i.e., Extremely High Throughput (EHT)), more than 1 GHz of additional unlicensed spectrum is likely to be available as the 6 GHz band (e.g., 5.925-7.125 GHZ) is being considered for unlicensed use. This would allow APs and STAs to become tri-band devices. Further, larger than 160 MHz data transmissions (e.g., 320 MHz) could be considered to increase the max PHY rate. For example, 320 MHz or 160+160 MHz data could be transmitted in the 6 GHz band. Alternatively, or in addition, 160+160 MHz data could be transmitted across the 5 and 6 GHz bands.

In some embodiments, a transmitting STA generates an EHT PPDU frame and transmits it to a receiving STA(s). The receiving STA receives, detects, and processes the EHT PPDU. The EHT PPDU frame may include a legacy part (e.g., an L-STF, an L-LTF, and an L-SIG field) and a non-legacy part. FIG. 9 includes a table 900, which describes fields of an EHT frame format. In particular, table 900 describes various fields that may be within the PHY preamble, data field, and midamble of an EHT frame format. For example, table 900 includes definitions 902, durations 904, Discrete Fourier transform (DFTs) periods 906, guard intervals (GIs) 908, and subcarrier spacings 910 for one or more of a legacy short training field (L-STF) 912, legacy long training field (L-LTF) 914, legacy signal field (L-SIG) 916, repeated L-SIG (RL-SIG) 918, universal signal field (U-SIG) 920, EHT signal field (EHT-SIG) 922, EHT hybrid automatic repeat request field (EHT-HARQ) 924, EHT short training field (EHT-STF) 926, EHT long training field (EHT-LTF) 928, EHT data field 930, and EHT midamble field (EHT-MA) 932.

The distributed nature of a channel access network, such as in IEEE 802.11 wireless networks, makes carrier sensing mechanisms important for collision free operation. The physical carrier sensing mechanism of one STA is responsible for detecting the transmissions of other STAs. However, it may be impossible to detect every single case in some circumstances. For example, one STA which may be a long distance away from another STA may see the medium as idle and begin transmitting a frame while the other STA is also transmitting. To overcome this hidden node, a network allocation vector (NAV) may be used. However, as wireless networks evolve to include simultaneous transmission/reception to/from multiple users within a single basic service set (BSS), such as uplink (UL)/downlink (DL) multi-user (MU) transmissions in a cascading manner, a mechanism may be needed to allow for such a situation. As used herein, a multi-user (MU) transmission refers to cases that multiple frames are transmitted to or from multiple STAs simultaneously using different resources. Examples of different resources are different frequency resources in OFDMA transmissions and different spatial streams in MU-MIMO transmissions. Therefore, DL-OFDMA, DL-MU-MIMO, UL-OFDMA, and UL-MU-MIMO are examples of MU transmissions.

Figure 10:
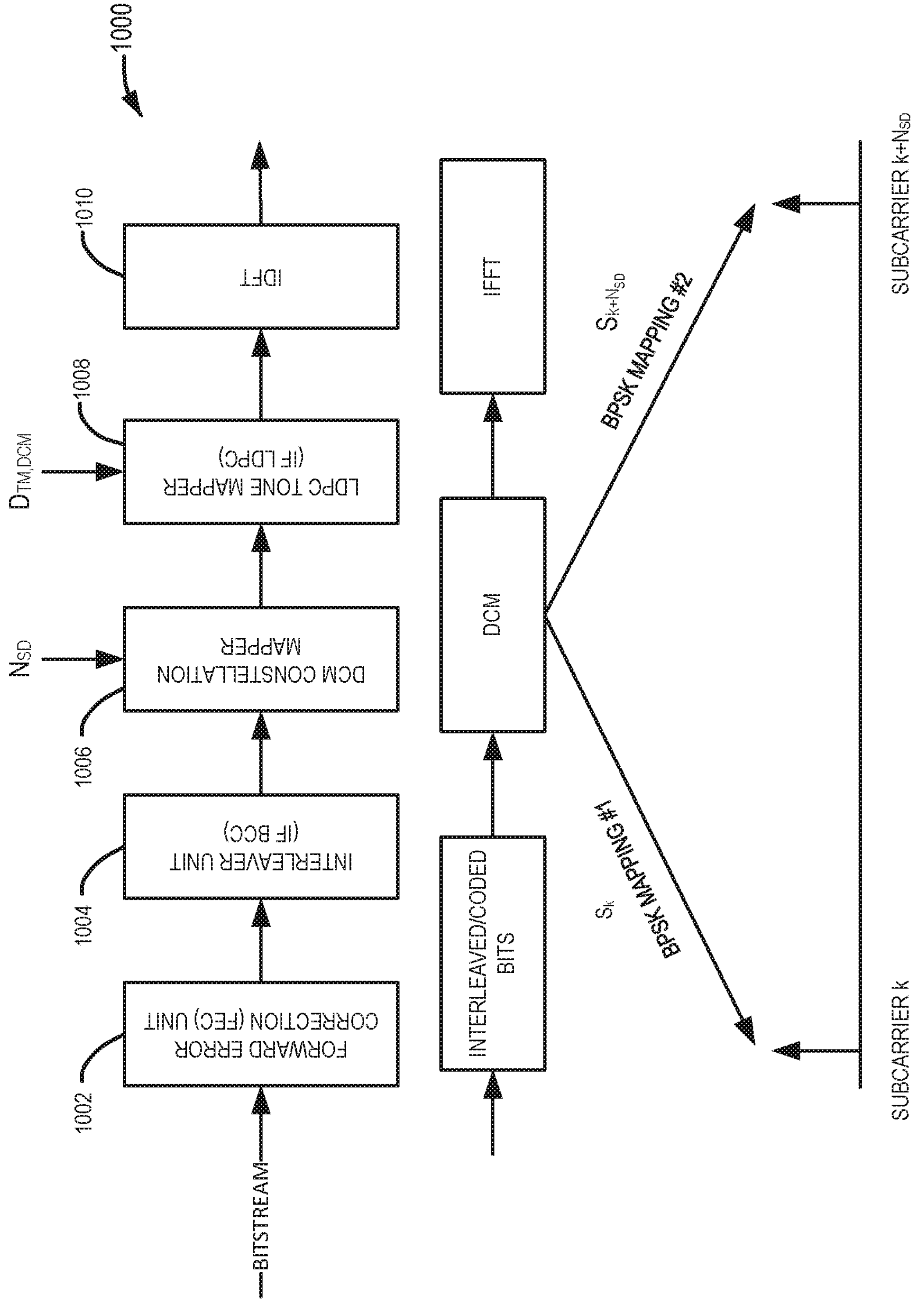
FIG. 10 shows a signal processing system, in accordance with some embodiments of the present disclosure.

FIG. 10 shows a signal processing system 1000, according to one example embodiment. As shown, a signal/bitstream is processed by a forward error correction (FEC) unit 1002 and the resulting coded bits are interleaved by an interleaver unit 1004 (e.g., a BCC interleaver) when binary convolutional coding (BCC) is utilized. Thereafter, the interleaved/error-corrected/coded bits are processed by a dual sub-carrier modulation (DCM) constellation mapper 1006, a low-density parity-check (LDPC) tone mapper 1008 (if LDPC is utilized), and an inverse DFT (IDFT) 1010. The interleaver unit 1004 may receive or otherwise determine a set of interleaving parameters/settings, including (1) a number of rows in a BCC interleaver and (2) a number of columns in the BCC interleaver. The DCM constellation mapper 1006 may receive or otherwise determine a set of parameters/settings, including a number of data subcarriers ($N_{SD}$) for modulating the error corrected bitstream to subcarriers in each half of an orthogonal frequency-division multiplexing (OFDM) symbol. The LDCP tone mapper 1008 may receive or otherwise determine a set of parameters/settings, including a distance between subcarriers ($D_{TM,DCM}$) in the OFDM symbol.

As shown in FIG. 10, $S_k$ and $S_{k+N_{SD}}$ are modulated symbols for data tone k and k+$N_{SD}$ in a DCM feature where $S_k$ and $S_{k+N_{SD}}$ are both binary phase shift keying (BPSK) modulated and $N_{SD}$ is defined as half of $N_{SD}$ in a non-DCM PPDU. To reduce a peak-to-average power ratio (PAPR) for a modulation and coding scheme (MCS) 0 in a DCM modulation, half of the modulated symbols are scrambled with $S_{k+N_{SD}}=S_k e^{j\pi(k+N_{SD})}$.

In a standard that is an evolution of the IEEE 802.11p standard and/or WAVE (the evolved standard being herein referred to as a WAVE2 standard), Doppler related information is used to support use cases in high Doppler circumstances/environments. Doppler information in a WAVE2 format PPDU may have a first value (e.g., 1), when one or more midamble fields are inserted after M data symbols, of the PPDU (M being a predetermined midamble periodicity), and a second value (e.g., 0) when midambles are not inserted in the PPDU.

Figure 11:
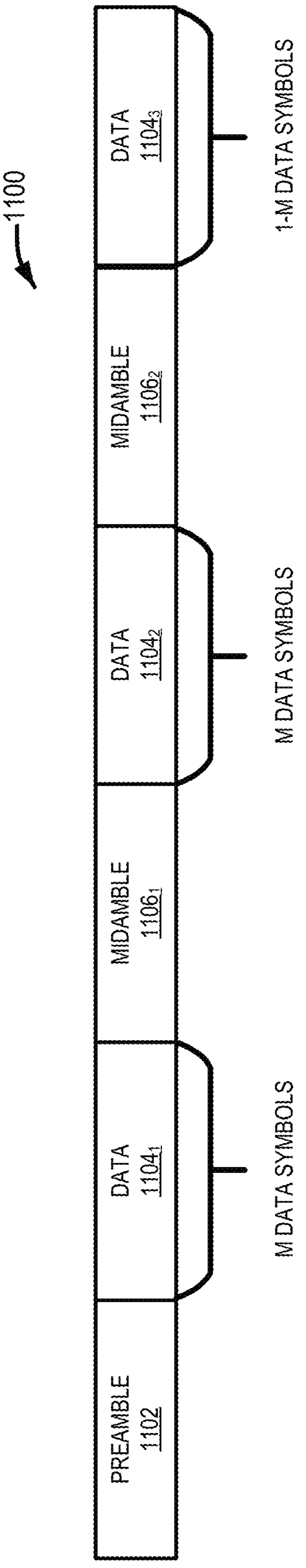
FIG. 11 shows a frame with a set of midambles at a specified periodicity, in accordance with some embodiments of the present disclosure.

FIG. 11 illustrates a WAVE2 PPDU 1100 PPDU according to an embodiment. The PPDU 1100 includes a preamble 1102, a first data field 11041, a first midamble 11061, a second data field 11042, a second midamble 11062, and a third data field 11043. Although the PPDU 1100 is shown as having two midambles 1106, embodiments are not limited thereto, and the PPDU 1100 may have any integer number greater than or equal to 0 of midambles. Each midamble is present after M data symbols, where M is a positive integer (e.g., 4, 8, 10, or 16) when there are additional data symbols following the midamble to transmit in the PPDU.

The preamble 1102 may include an L-STF, an L-LTF, an L-SIG field, and one or more WAVE2 signal fields. In some embodiments, the preamble 1102 may also include one or more WAVE2 STF fields. In some embodiments, the preamble 1102 may also include one or more WAVE2 LTF fields.

Especially in a high Doppler channel, to insert a midamble field will assist in channel tracking so that accurate channel state information (CSI) is obtained. However, as more midambles with short durations are inserted between OFDM data symbols, performance of transmitted packets will be degraded as overhead related to the midambles presence increases. Accordingly, there is a trade-off between dense and sparse midambles inserted in a data field of a frame. In a dense case, the presence of many midambles will reduce system performance unnecessarily. In a sparse case, the presence of comparatively few midambles may not ensure throughput performance improvements by not providing accurate channel estimate, particularly with use of high modulation (e.g., high MCS) in high Doppler environments.

This trade-off could be resolved by using a compressed midamble between OFDM data symbols instead on an uncompressed midamble structure. This enables reduction of the midamble per symbol duration to 1/N by sampling every N tones in a LTF, wherein the LTF can be used to decode a PPDU (e.g., an LTF in a frame for IEEE 802.11bd or 802.11be). In the time domain, with sampling every two tones, after IFFT, the time domain has two periods per symbol. It can take half of the waveform by transmitting one period symbol to generate the compressed midamble. The guard interval duration of the compressed midamble may be the same with an uncompressed LTF perpended to resolve channel delay spread. In particular, sampling tones in the LTF will not lose much CSI by receiver interpolation for most channels when Doppler impact is compensated to a large enough degree. In detail, for even tones the channel can be directly estimated using the midamble and for odd tones the channel needs to be interpolated, which adds receiver complexity. When applying with repeated compressed midambles, it could even provide channel estimation gain similar to a legacy LTF.

Figure 12A:
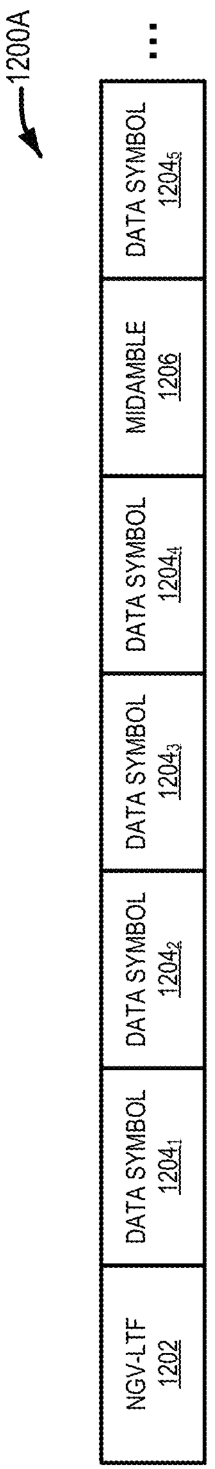
FIGS. 12A-12C shows a set of frames with different types of midambles, in accordance with some embodiments of the present disclosure.
Figure 12B:
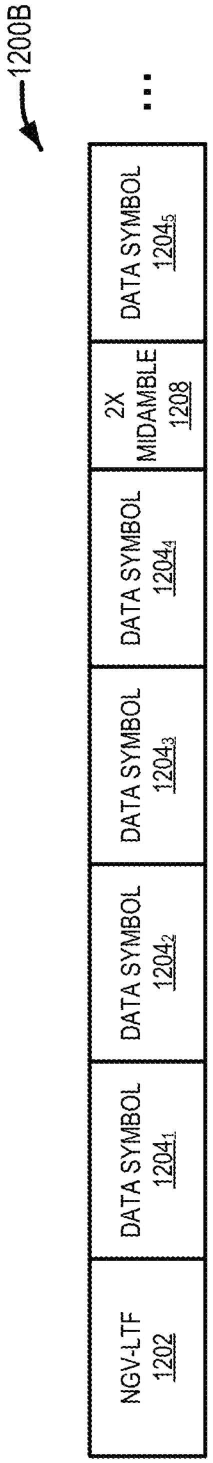
Figure 12C:
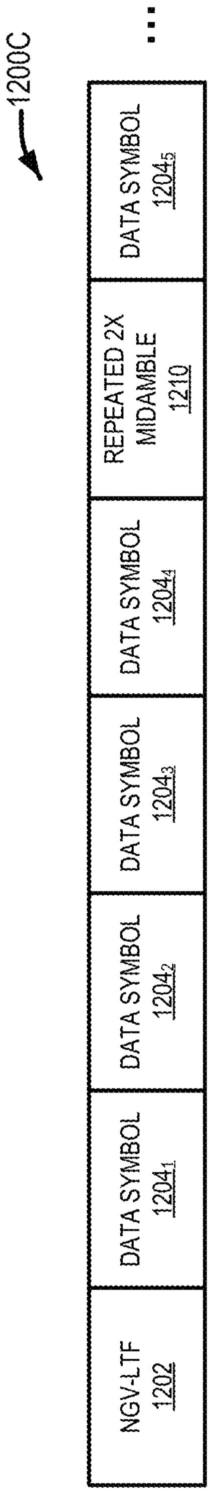

FIGS. 12A, 12B, and 12C show examples of frames 1200A, 1200B, and 1200C, respectively, with an uncompressed midamble 1206, a compressed midamble 1208 (e.g., 2× midamble), and a repeated compressed midamble 1210. In FIGS. 12A-12C, the NGV-LTF 1202 in these frames 1200A-1200C could be an EHT-LTF (i.e., an LTF according to IEEE 802.11bc). Further, a midamble per symbol duration is 1/2 for a compressed midamble and M is set to four with a midamble inserted after four data symbols 1204 (e.g., an uncompressed midamble 1206 is inserted after the four data symbols $\mathbf{1204}_1$-$\mathbf{1204}_4$ and before the data symbol $\mathbf{1204}_5$ in FIG. 12A, a compressed midamble 1208 (e.g., 2× midamble) is inserted after the four data symbols $\mathbf{1204}_1$-$\mathbf{1204}_4$ and before the data symbol $\mathbf{1204}_5$ in FIG. 12B, and a repeated compressed midamble 1210 is inserted after the four data symbols $\mathbf{1204}_1$-$\mathbf{1204}_4$ and before the data symbol $\mathbf{1204}_5$ in FIG. 12C). However, the midamble per symbol duration could be 1/N, (e.g. N=4 or 8).

Choosing different midamble periodicities may affect packet transmission performance. For instance, assuming mobility environments in a Doppler channel, a system with a fixed midamble periodicity could be vulnerable because a required midamble period to achieve better performance could be different depending on circumstances. For example, when using a short midamble period (e.g., M=4 such that one midamble covers four data symbols 1204), a transmission may be affected by corresponding overhead and degraded throughput performance if there is not a large packet error rate (PER) performance difference between short and long midamble periods (e.g., M=8 such that one midamble covers eight date symbols) (where throughput is affected by PHY data rate, PER, and midamble per data symbol duration). This means that choosing a short midamble period is likely to increase unnecessary overhead while still not improving PER performance. In the end, midamble periodicity can impact throughput performance from the perspective of the system. When using a low data rate (e.g. a lower MCS, such as BPSK or 1/2 code rate), a long midamble period could be sufficient for improving performance because the frame is already robust to high Doppler environments through the use of a low MCS level/rate.

When using a long midamble period (e.g., M=8 such that one midamble is used/inserted after eight data symbols 1204), if there is not a big PER performance difference compared to a short midamble period, it is more advantageous to use a long midamble period in terms of throughput performance. However, in a fast channel variation environment, a long midamble period has a limitation in updating rapidly changing channel state information (CSI). Consequently, with a high data rate (e.g., higher MCS), the PER performance is greatly degraded.

However, use of different midamble periodicities may be necessary and dependent on the channel and different MCSs. For example, in a high doppler channel, a short midamble period may be needed for accurate CSI while for a relatively low Doppler channel, a long midamble period can be used to obtain CSI in terms of overhead benefits if there is not a large difference with CSI accuracy between short and long midamble periods. More specifically, there is a midamble period required to increase PER and throughput performance while reducing overhead according to MCS level and different channel conditions. Accordingly, a variable midamble period is a more effective solution than a fixed midamble period.

In simulations, PER and throughput performance results of a fixed midamble period (e.g., M=6) and a variable midamble period that was selected based on MCS and channel characteristics were compared. In these simulations, the data packet size is approximately 350 bytes. For a fixed midamble design, a midamble is inserted after every six data symbols 1204 (i.e., M=6). For a variable midamble design, a midamble is inserted after every four or eight data symbols 1204 (depending on the selection of M). The environments include an enhanced rural line of sight (LOS) environment that represents a relatively lower to mid Doppler channel and a highway non-LOS environment that represents a mid to higher Doppler channel.

To provide stable performance over different channel characteristics/environments with especially high mobility of stations and different MCSs, choosing a midamble period depending on MCS and channel circumstance is a key factor. In one embodiment, a signaling field of a PPDU/frame may include an indication of a midamble period used for the frame. For example, a single bit of control information may be reserved or added to a signaling field of a frame to indicate a midamble period used for the frame. The use of this signaling information for indicating a midamble period used in the frame will allow the use of a variable midamble and consequently improve performance of communications in varied environments and with different MCSs. Further, adding a midamble period indication with a single bit minorly increases overhead, but it achieves much higher gain in terms of system throughput performance.

In one embodiment, a signaling field of a frame includes first information to indicate a midamble periodicity of the frame (i.e., a midamble indication or a midamble period indication). The first information may indicate at least two values: M1 and M2. In this embodiment, M1 indicates that a midamble is inserted after every M1 data symbols in a data field of the frame whereas M2 means a midamble is inserted after every M2 data symbols in a data field of the frame. Further M1 is not equal to M2 and M1>M2. In one embodiment, M1 is eight and M2 is four. The first information could be included in a signaling field (SIG field) for an upcoming amendment to the IEEE 802.11 standard (e.g., IEEE 802.11bd or 802.11bc).

In some embodiments, the first information described above (i.e., a midamble indication) could be implicitly indicated by an MCS field within a signaling field of the frame. In these embodiments, when the MCS field indicates a first value, a midamble is inserted/used after every M1 data symbols and when the MCS field indicates a second value, a midamble is inserted/used after every M2 data symbols. In one embodiment, the first value could directly indicate a low MCS. For example, the first value could indicate MCS0 (BPSK 1/2), MCS1 (QPSK 1/2), MCS2 (QPSK 3/4), MCS3 (16QAM 1/2), or MCS4 (16QAM 3/4). Similarly, the second value could directly indicate a high MCS. For example, the second value could indicate MCS6 (64QAM 3/4), MCS7, (64QAM 5/6), or MCS8 (256QAM 3/4). In some embodiments, the first value could indicate a low modulation level (e.g., BPSK, QPSK, and 16QAM with any code rate) and the second value could indicate high modulation level (e.g., 64QAM, 256QAM, and higher with any code rate).

Although described in relation to two implicit indication values, in some embodiments, each MCS value may implicitly indicate a different value for the first information (e.g., a different number of symbols between each midamble). For example, when the MCS field indicates a first value, a midamble is inserted/used after every M1 data symbols; when the MCS field indicates a second value, a midamble is inserted/used after every M2 data symbols; when the MCS field indicates a third value, a midamble is inserted/used after every M3 data symbols; and when the MCS field indicates an Nth value, a midamble is inserted/used after every $M_N$ data symbols. In this embodiment, the first value could indicate use of BPSK, the second value could indicate use of QPSK, a third value could indicate use of 16QAM, and the Nth value could indicate use of the highest modulation level allowed in the wireless network or applicable wireless standard/protocol, where $M1 \geq M2 \geq \ldots \geq M_N$.

When it comes to the midamble types described above (e.g., uncompressed, compressed, repeated and compressed, etc.), there are pros and cons for each type. For example, as noted above, a compressed midamble can minimize overhead but PER performance undergoes deterioration in long delay spread channels. However, an uncompressed midamble ensures better PER performance in a high Doppler channel than a compressed midamble but an uncompressed midamble experiences higher overhead, which can affect throughput performance. Therefore, selection of a midamble type by considering the channel may impact system performance.

Further, the use of a compressed midamble requires that pilot locations need to be altered when pilot tones are punctured out unintentionally. For comparison, pilot tone locations in IEEE 802.11ac for a 20 MHz PPDU format are [−21, −7, 7, 21], which is downclocked by two for 10 MHz PPDUs in IEEE 802.11bd. In an IEEE 802.11ax PPDU, pilot locations are defined differently according to resource unit (RU) size and duration of a high efficiency (HE) long training field (LTF). For example, a 26-tone RU will use two pilots, and a 52-tone RU will use four pilots. In a 4× HE-LTF, pilot tone/subcarrier locations in an HE-LTF are the same as the pilot tone locations for a data field. In a 2×HE-LTF, pilot tone locations are the same as the pilot tone locations for a 4× data symbol. In a 1×HE-LTF, pilot tone locations only consist of the pilot tone locations for the data filed that are multiples of four.

To prevent pilot tones from puncturing out, pilot tones on odd tones need to be shifted. In one embodiment, when a compressed midamble is used, if pilot tones are located on odd tones, the pilot tones are shifted by $\pm\alpha$, wherein when the pilot tone index is less than 0, $-\alpha$ is applied to shift the location of the pilot tone and when index is greater than 0, a is applied to shift the location of pilot tones. For example, given four pilot tones at subcarriers $k \in \{-21, -7, 7, 21\}$ on odd tones, these four pilot tones are shifted and inserted in subcarriers $k \in \{-21-\alpha, -7-\alpha, 7+\alpha, 21+\alpha\}$. Given six pilot tones at subcarriers $k \in \{-53, -25, -11, 11, 25, 53\}$ on odd tones, these six pilot tones are shifted and inserted in subcarriers k∈{−53−α, −25−α, −11−α, 11+α, 25+α, 53+α}. In this example, α could be one.

In one embodiment, regardless of the type of midamble, pilot tones are always located on even tones. Given four pilot tones, subcarriers k∈{−21−α1, −7−α2, 7+α3, 21+α4} represent the locations of the pilot tones in a 10 MHz PPDU. Given six pilot tones, subcarriers k∈{−53−β1, −25−β2, −11−β3, 11+β4, 25+β5, 53+β6} represent the locations of the pilot tones in a 20 MHz PPDU. In this example, α1, α2, α3, and α4 are odd tones and β1, β2, β3, β4, β5, and β6 are odd tones. Each value could be the same or different. In the examples above, given four pilot tones, subcarriers k∈{−22, −8, 8, 22} are the locations of the pilot tones in a 10 MHz PPDU (i.e., α1=α2=α3=α4=1). Given six pilot tones, subcarriers k∈{−54, −26, −12, 12, 26, 54} are the locations of the pilot tones in a 20 MHz PPDU (i.e., β1=β2=β3=β4=5=β6=1).

In some embodiments, given four pilot tones, the subcarriers k∈{−a, −b, b, a} represent the locations of the pilot tones in a 10 MHz PPDU. Given eight pilot tones, subcarriers k∈{pilot subcarrier indices in 10 MHz−32, pilot subcarrier indices in 10 MHz+32} represent the locations of the pilot tones in a PPDU, wherein a and b are on even tones.

Simulations were performed to compare performance of different midamble sizes depending on MCS and channel circumstances/environments where the data packet size is 310 bytes. In these simulations, a midamble is inserted after every four data symbols and three different midamble types are used (e.g., uncompressed, compressed, and compressed-repeated midambles) for various environments. The environments include an enhanced, rural line of sight (LOS) environment that represents a relatively lower Doppler channel and a highway non-LOS environment that represents a relatively higher Doppler channel.

Based on these simulations, a repeated, compressed midamble (RCMA) with a low MCS (e.g., BPSK or QPSK) shows better performance gain for some channels, such as high non-LOS. Since dual carrier modulation (DCM) provides lower sensitivity for improved coverage at the expense of a lower data rate (e.g., half compared to no DCM applied), RCMA could compensate for this performance loss.

In one embodiment, when a DCM operation/module is enabled, RCMA could also be enabled. When a first indicator (e.g., a DCM indicator) in a PPDU indicates that DCM is used for the PPDU (i.e., the first indicator is set to a first value), a second indicator that indicates a type of midamble used in the PPDU could allow for indication of a compressed midamble (e.g., a RCMA). In one embodiment, the first indicator could be set to one to indicate DCM is enabled and the first indicator may be DCM control information. In some embodiments, the first indicator may be MCS control information. In some embodiments, the first value could indicate (1) BPSK modulation, (2) QBPSK modulation, and (3) BPSK modulation and a 1/2 code rate is used in the PPDU.

As noted above, the second indicator could indicate RCMA is used in the PPDU but could alternatively indicate a generally compressed midamble. In some embodiments this second indicator may be represented by midamble control information.

In some embodiments, the first indicator may be enabled implicitly when an MCS is set to a second value. In these embodiments, the second value could indicate use of BPSK modulation, BPSK modulation and a 1/2 code rate, or a specific MCS indicating DCM, such as BPSK 1/2 with repetition.

Assuming that combined features of both an LTF and midamble size make it possible to achieve greater performance gains, there are a few options according to channel characteristics and MCS level. If an LTF and midamble size is set to a default value, this set of default values/settings can be considered Mode A. If a value of the LTF is a default value and a midamble is compressed, this set of values/settings can be considered Mode B. When both the LTF and midamble are compressed, this set of values/settings can be considered Mode C.

When assuming a high Doppler channel and a high MCS, Mode A achieves better overall performance than Mode B and Mode C because Mode A can follow/compensate for a quickly varying channel. This in turn can guarantee more accurate CSI. On the other hand, with a low MCS, packets are less affected by channel characteristics compared to a high MCS scenario. Therefore, overall performance may be similar for each option/mode. When assuming channel variation is low/stable, if there is a low PER performance difference between Mode A, Mode B, and Mode C, choosing Mode C can more efficiently achieve throughput performance gains. Thus, modifying the size of an LTF and midamble appropriately according to channel conditions and MCS may achieve performance gains when considering both LTF and midambles according to set modes.

In one embodiment, a PPDU/frame includes first information and second information to indicate different LTF sizes and different midamble sizes, respectively. The first information (e.g., an LTF size/type indication) and the second information (e.g., a midamble size/type indication) could be included in a signaling field of a PPDU/frame. In this configuration, the first information could indicate whether an LTF is compressed or not. Accordingly, when the first information indicates a first value, a compressed LTF is inserted/used in a preamble portion of the PPDU. When the first information indicates a second value, an uncompressed LTF is inserted/used in the preamble portion of the PPDU.

Further, in the above configuration, the second information could indicate whether a midamble in the PPDU is compressed or not. For example, when the second information indicates a first value, a compressed midamble is inserted/used in a data portion of the PPDU (e.g., RCMA). When the second information indicates a second value, an uncompressed midamble is inserted/used in a data portion of the PPDU.

In some embodiments, when the first information indicates the first value, (e.g., corresponding to a compressed LTF), the second information indicates the first value. (e.g., corresponding to a compressed midamble). When there is no interpolation loss, a compressed LTF and midamble can be used together in the same PPDU.

In some embodiments, when the first information indicates the second value, (e.g., corresponding to an uncompressed LTF), the second information could indicate the first value (e.g., corresponding to a compressed midamble) or the second value (e.g., corresponding to an uncompressed midamble). Even though the LTF is an uncompressed LTF sequence, to reduce midamble overhead the midamble could be a compressed midamble.

In some embodiments, the second information could be implicitly indicated based on an MCS field. In this configuration, when the MCS field indicates a first value, a compressed midamble is inserted/used in a data portion of the PPDU and when the MCS field indicates a second value, an uncompressed midamble is inserted/used in a data portion of the PPDU. In some embodiments, the first value could indicate a low MCS. For example, first value could indicate MCS0 (BPSK 1/2), MCS1 (QPSK 1/2), MCS2 (QPSK 3/4), MCS3 (16QAM 1/2), or MCS4 (16QAM 3/4). Further, the second value indicate a high MCS. For example, the second value could indicate MCS 6 (64QAM 3/4), MCS7 (64QAM 5/6), or MCS8 (256QAM 3/4).

In some embodiments where the first value for an MCS field indicates a low modulation level, the first value may indicate BPSK, QPSK, or 16QAM with any code rate. Further, when the second value for an MCS field indicates a high modulation level, the second value may indicate 64QAM, 256QAM, or a higher modulation with any code rate.

In some embodiments where the second information could be implicitly indicated by an MCS field, when the MCS field indicates a first value, a compressed midamble with a midamble per symbol duration of 1/4 of an uncompressed midamble is inserted in a data portion of a PPDU and when the MCS field indicates a second value, a compressed midamble with a midamble per symbol duration of 1/2 of an uncompressed midamble is inserted in a data portion of the PPDU. This pattern would continue until the MCS field indicates a value N, which indicates an uncompressed midamble is inserted in a data portion of the PPDU. In these embodiments, the first value could indicate use of a low MCS (e.g., BPSK or QPSK), the second value could indicate use of medium MCS (e.g., 16 QAM), and the Nth value could indicate use of the highest modulation level available in a wireless network.

As noted above, in some embodiments, a PPDU may include first information and second information to indicate different LTF sizes and different midamble sizes, respectively. The first information and the second information could be included in signaling field of the PPDU. In one embodiment, the first information could indicate whether an LTF of the PPDU is uncompressed (e.g., a 4×LTF) or compressed (e.g., a 2×LTF or a 1×LTF). In particular, when the first information indicates a first value, an uncompressed LTF is inserted/used in a preamble portion of the PPDU. When the first information indicates a second value, a compressed LTF (e.g., a 2×LTF) is inserted/used in the preamble portion of the PPDU. When the first information indicates a third value, a compressed LTF (e.g., 1×LTF) is inserted/used in the preamble portion of the PPDU.

As noted above, the second information could indicate whether a midamble in a PPDU is uncompressed (e.g., a 4× midamble) or compressed (e.g., a 2× midamble or a 1× midamble). For example, when the second information indicates a first value, an uncompressed midamble (e.g., a 4× midamble) is inserted/used in a data portion of a PPDU. When the second information indicates a second value, an uncompressed midamble (e.g., a 2× midamble) is inserted/used in a data portion of the PPDU. When the second information indicates a third value, a compressed midamble (e.g., a 1× midamble) is inserted/used in a data portion of the PPDU.

In some embodiments, when the first information indicates a first value (e.g., corresponding to a 4×LTF), the second information could allow values that indicate a compressed (e.g., corresponding to 2× midambles) or uncompressed midamble (e.g., corresponding 4× midamble. With relatively stable circumstances and considering no interpolation loss, a compressed midamble can be used.

In some embodiments, when the first information indicates a second value (e.g., corresponding to a 2×LTF), the second information could allow values that indicate a similarly compressed midamble (e.g., a 2× midamble) or a more compressed midamble (e.g., a 1× midamble). Even though the LTF is a compressed LTF (e.g., a 2×LTF), to reduce midamble overhead, a midamble could be more compressed (e.g., 1×LTF) compared to the LTF.

In some embodiments, when the first information indicates a third value (e.g., a 1×LTF), the second information could allow values that indicate a similarly compressed midamble (e.g., a 1× midamble). Considering no interpolation loss, compressed types of the LTF and the midamble can be used in a PPDU.

In some embodiments, the second information could be implicitly indicated based on an MCS field of the PPDU. For example, when the MCS field indicates a first value, a first type of compressed midamble (e.g., 1× midamble) is inserted/used in a data portion of a PPDU. When an MCS field indicates a second value, a second type of compressed midamble (e.g., 2× midamble) is inserted/used in a data portion of the PPDU. When an MCS field indicates a third value, an uncompressed midamble (e.g., a 4× midamble) is inserted/used in a data portion of the PPDU. In one embodiment, the first value could indicate a low MCS. For example, the first value could indicate MCS0 (BPSK 1/2), MCS1 (QPSK 1/2), or MCS2 (QPSK 3/4). In one embodiment, the second value could indicate a medium MCS. For example, the second value indicate MCS3 (16QAM 1/2), MCS4 (16QAM 3/4), MCS5 (64QAM 2/3), MCS 6 (64QAM 3/4), or MCS7 (64QAM 5/6). In one embodiment, the third value could indicate a higher MCS. For example, the third value could indicate MCS8 (256QAM 3/4), 1024QAM, or a higher modulation.

In some embodiments, the first value could indicate a low modulation level (e.g., BPSK or QPSK with any code rate), and the second value could indicate a medium modulation level (e.g., 16QAM or 64QAM), and the third value could indicate a high modulation level (e.g., 256QAM, 1024QAM, or a higher modulation level with any data rate). In some embodiments, the first and second information could be implicitly indicated by an MCS field of a PPDU. In this configuration, when the MCS field indicates a first value (e.g. BPSK or QPSK), an uncompressed LTF is inserted/used in a preamble portion of the PPDU and an uncompressed midamble is inserted/used in a data portion of the PPDU; when the MCS field indicates a second value (e.g., 16 QAM or 64QAM), an uncompressed LTF is inserted/used in a preamble portion of the PPDU and a compressed midamble is inserted/used in a data portion of the PPDU; and when the MCS field indicates an N value (i.e., a highest MCS in the wireless network), a compressed LTF (highest compression) is inserted in a preamble portion of the PPDU and a compressed midamble (highest compression) is inserted in data portion of the PPDU.

As noted above, in some embodiments, a single field may be used to indicate the combination of different LTF sizes and midamble sizes through the use of a single piece of information (e.g., a single value) and this single field may be in a signaling field of a PPDU. By using a single piece of information/a single value, the number of bits needed to indicate both an LTF size and a midamble size may be reduced. In one embodiment, the information representing the LTF and midamble size comprises three bits. Six states of the three bits to indicate different combinations of LTF and midamble sizes instead of two bits devoted to an LTF size and two bits devoted to a midamble size. The information representing the LTF and midamble sizes could indicate that both or either are compressed or uncompressed and if compressed, what level of compression (e.g., 2× or 1×). For example, when the information indicates a first value, an uncompressed LTF (e.g., a 4×LTF) is inserted/used in a preamble portion of the PPDU and an uncompressed midamble (e.g., a 4× midamble) is inserted/used in a data portion of the PPDU. When the information indicates a second value, an uncompressed LTF (e.g., a 4×LTF) is inserted/used in a preamble portion of the PPDU and a compressed midamble (e.g., a 2× midamble) is inserted/used in a data portion of the PPDU. When the information indicates a third value, an uncompressed LTF (e.g., a 4×LTF) is inserted/used in a preamble portion of the PPDU and a compressed midamble (e.g., a 1× midamble) is inserted/used in a data portion of the PPDU. When the information indicates a fourth value, a compressed LTF (e.g., a 2×LTF) is inserted/used in a preamble portion of the PPDU and a compressed midamble (e.g., a 2× midamble) is inserted/used in a data portion of the PPDU. When the information indicates a fifth value, a compressed LTF (e.g., a 2×LTF) is inserted/used in a preamble portion of the PPDU and a compressed midamble (e.g., a 1× midamble) is inserted/used in a data portion of the PPDU. When the information indicates a sixth value, a compressed LTF (e.g., a 1×LTF) is inserted/used in a preamble portion of the PPDU and a compressed midamble (e.g., a 1× midamble) is inserted/used in a data portion of the PPDU. The two remaining values/states for the three bits may be reserved.

In some embodiments, the information indicating the combined LTF and midamble sizes could be implicitly indicated based on an MCS field of the PDDU. In these embodiments, the first value, second value, third value, fourth value, fifth value and sixth value described above are represented by the MCS field and indicates the type/size of the LTF and midamble used for the PPDU. In this configuration, the first value could indicate a high MCS (e.g., MCS 6 (64QAM 3/4), MCS7 (64QAM 5/6), or MCS8 (256QAM 3/4)) and the sixth value could indicate a low MCS (e.g., MCS0 (BPSK 1/2), MCS1 (QPSK 1/2), MCS2 (QPSK 3/4), MCS3 (16QAM 1/2), MCS4 (16QAM 3/4), or MCS5 (64QAM 2/3)).

Accordingly, the sizes of the LTF and midamble used in the PPDU are implicitly indicated by the MCS field such that when the MCS field indicates a first value, an uncompressed LTF is inserted/used in a preamble portion of the PPDU and an uncompressed midamble is inserted/used in a data portion of the PPDU, when the MCS field indicates a second value, an uncompressed LTF is inserted/used in a preamble portion of the PPDU and a first type of compressed midamble is inserted/used in a data portion of the PPDU, and when the MCS field indicates a Nth value, a last type of compressed LTF is inserted/used in a preamble portion of the PPDU and a last type of compressed midamble is inserted/used in a data portion of the PPDU. In some embodiments, the first value could indicate a high MCS (e.g., 256QAM), the second value could indicate a medium MCS (e.g., 16QAM), and the Nth value could indicate the lowest modulation level available in the wireless network.

Allowing/utilizing a variable midamble periodicity and midamble type (e.g., size) in a wireless network system not only reduces overhead but also increases throughput performance. For example, using a long midamble period (e.g., M=8 such that one midamble is used after eight data symbols) and an uncompressed midamble size (e.g., a 4× midamble) with a low MCS, it is expected that PER performance is not significantly different than when using a short period midamble (e.g., M=4 such that one midamble is used after four data symbols) and the same midamble size. In this case, the former case achieves higher throughput performance. In addition to this situation, to reduce additional overhead and achieve even higher throughput performance, assume that the midamble period is the same as before and the size of the midamble is considerably shorter (e.g., a 2× midamble or a 1× midamble). If there is no deterioration in PER performance compared to the previous situation, it is more advantageous to compose a midamble structure with a short midamble size in addition to a long midamble period.

When applying a short midamble period (e.g. M=4 such that one midamble is used after four data symbols) and an uncompressed midamble with a high MCS, if the PER performance is guaranteed since the channel environment is not quickly varying, it is effective to apply a short midamble size to increase throughput performance.

As previously noted, in one embodiment, first information in a PPDU may be used to indicate midamble periodicity, where there are at least two values for the first information: M1 and M2. Second information in the PPDU may be used to indicate different midamble sizes. Both the first and second information may be included in a signaling field of the PPDU. In this configuration, M1 indicates that a midamble is inserted/used every M1 data symbols in a data field of the PPDU and M2 indicates that a midamble is inserted/used every M2 data symbols in a data field of the PPDU. As used here, M1 is not equal to M2 and M1>M2. For example, M1 could be eight and M2 could be four. In some embodiments, the second information could also be used to indicate whether an LTF is compressed or uncompressed.

In some embodiments, when the first information indicates a value of M1, the second value can indicate a first value (e.g., a 4× uncompressed midamble), a second value (e.g., a 2× compressed midamble), or a third value (e.g., a 1× compressed midamble). When the first information indicates a value of M2, the second value can indicate a first value (e.g., a 4× uncompressed midamble), a second value (e.g., a 2× compressed midamble), or a third value (e.g., a 1× compressed midamble).

Wireless network systems can rely on retransmission of media access control (MAC) protocol data units (MPDUs) when the transmitter (TX) does not receive an acknowledgement from the receiver (RX) or MPDUs are not successfully decoded by the receiver. Using an automatic repeat request (ARQ) approach, the receiver discards the last failed MPDU before receiving the newly retransmitted MPDU. With requirements of enhanced reliability and reduced latency, the wireless network system can evolve toward a hybrid ARQ (HARQ) approach.

There are two methods of HARQ processing. In a first type of HARQ scheme, also referred to as chase combining (CC) HARQ (CC-HARQ) scheme, signals to be retransmitted are the same as the signals that previously failed because all subpackets to be retransmitted use the same puncturing pattern. The puncturing is needed to remove some of the parity bits after encoding using an error-correction code. The reason why the same puncturing pattern is used with CC-HARQ is to generate a coded data sequence with forward error correction (FEC) and to make the receiver use a maximum-ratio combining (MRC) to combine the received, retransmitted bits with the same bits from the previous transmission. For example, information sequences are transmitted in packets with a fixed length. At a receiver, error correction and detection are carried out over the whole packet. However, the ARQ scheme may be inefficient in the presence of burst errors. To solve this more efficiently, subpackets are used. In subpacket transmissions, only those subpackets that include errors need to be retransmitted.

Since the receiver uses both the current and the previously received subpackets for decoding data, the error probability in decoding decreases as the number of used subpackets increases. The decoding process passes a cyclic redundancy check (CRC) and ends when the entire packet is decoded without error or the maximum number of subpackets is reached In particular, this scheme operates on a stop-and-wait protocol such that if the receiver can decode the packet, it sends an acknowledgement (ACK) to the transmitter. When the transmitter receives an ACK successfully, it terminates the HAPQ transmission of the packet. If the receiver cannot decode the packet, it sends a negative acknowledgement (NAK) to the transmitter and the transmitter performs the retransmission process.

In a second type of HARQ scheme, also referred to as an incremental redundancy (IR) HARQ (IR-HARQ) scheme, different puncturing patterns are used for each subpacket such that the signal changes for each retransmitted subpacket in comparison to the originally transmitted subpacket. IR-HARQ alternatively uses two puncturing patterns for odd numbered and even numbered transmissions, respectively. The redundancy scheme of IR-HARQ improves the log likelihood ratio (LLR) of parity bit(s) in order to combine information sent across different transmissions due to requests and lowers the code rate as the additional subpacket is used. This results in a lower error rate of the subpacket in comparison to CC-HARQ. The puncturing pattern used in IR-HARQ is indicated by a subpacket identity (SPID) indication. The SPID of the first subpacket may always be set to 0 and all the systematic bits and the punctured parity bits are transmitted in the first subpacket. Self-decoding is possible when the receiving signal-to-noise ratio (SNR) environment is good (i.e., a high SNR). In some embodiments, subpackets with corresponding SPIDs to be transmitted are in increasing order of SPID but can be exchanged/switched except for the first SPID.

In one embodiment, when a packet retransmission occurs, control information which indicates midamble periodicity follows the rules below, wherein midamble periodicity includes M1, M2, . . . $M_N$ (M1>M2> . . . $M_N$): (1) a first STA transmits a first packet with midamble periodicity M1 such that a midamble is inserted after every M1 data symbols in the data portion of the first packet; (2) the first STA receives a signal that the first packet was not delivered successfully (e.g., a NAK); and (3) the first STA retransmits the first packet with its own HARQ process (e.g., CC-HARQ or IR-HARQ) and the control information in the retransmission indicates the same midamble periodicity or a denser midamble periodicity than the previous transmission such that the retransmitted packet includes a midamble periodicity of M1 or M2. In this configuration M1 could be 8 and M2 could be 4 or M1 could be 20 and M2 could be 10.

Figure 13:
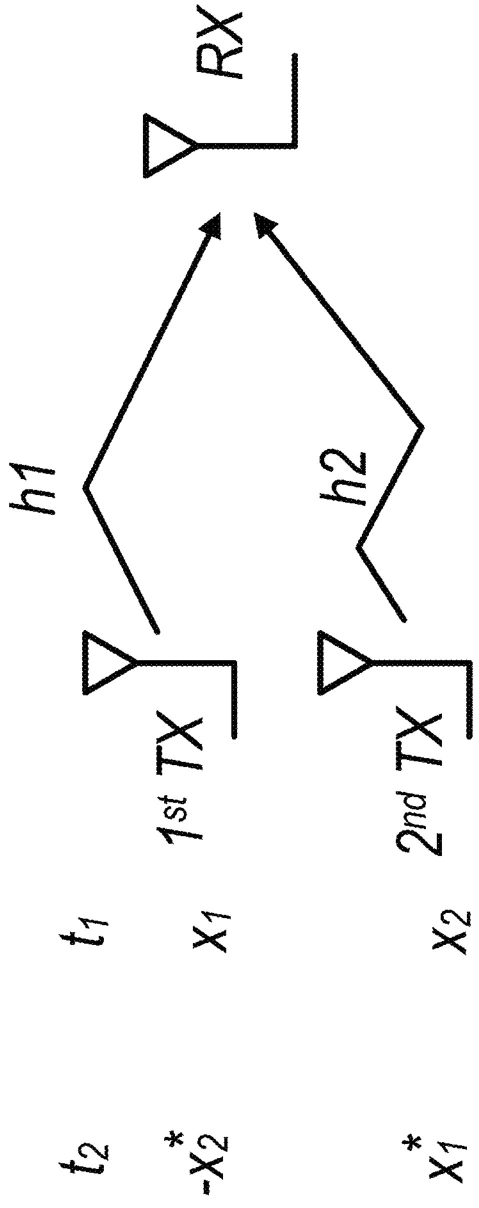
FIG. 13 shows a set of signals transmitted by a station and received by another station, in accordance with some embodiments of the present disclosure.

For IEEE 802.11 devices, there are two main technique from a theoretical concept to a practical technique for enhancing performance of a wireless network. The first one is STBC. STBC provides robust link performance over edge areas of AP/network coverage. In short, STBC is a multiple antenna technique in which multiple OFDM symbols are transmitted as a block (e.g., a two-dimensional array) of multiple antennas (i.e., representation space) and symbol time. There can be different ways on how to arrange the OFDM symbols within the block to be transmitted. For example, one of the arrangements includes arranging two OFDM symbols simultaneously to be paired to transmit through two time slots. After two OFDM symbols are received, the receiver combines the received signals to extract the transmitted OFDM symbols by using CSI of each signal along with mathematical manipulation as shown in FIG. 13. CSI information does not need to be fed back to the transmitter.

Given the value of the number of spatial streams in the transmitter is one, the transmitter can perform an STBC operation. In particular, the transmitter is required to have at least two transmit chains available to transmit two data symbols during two consecutive slots as shown in FIG. 13, wherein in the first time slot, the transmitter sends $x_1$ and $x_2$ from the first and second transmit chains, respectively, in the environments represented by h1 and h2. In the second time slot, the transmitter sends $$-x_2^* \text{ and } x_1^*$$

from the first and second transmit chains, respectively (assuming during the two time slots $t_1$ and $t_2$, there are no channel condition changes), in the environments represented by h1 and h2.

The next technique is the use of multiple input multiple output (MIMO) methods. MIMO methods can be implemented to provide multiple independent data streams simultaneously. This technique can achieve much higher data throughput in comparison to single input single output (SISO) methods. MIMO can provide large gains for both channel capacity and reliability, via the use of STBC (i.e., diversity gain oriented) in some scenarios, by transmitting combined streams (i.e., multiplexed signal transmission (i.e. spatially multiplexing gain)). There are two types of MIMO techniques. The first one is point-to-point MIMO (SU-MIMO). In this case, the extra spatial degree of freedom (DoF) due to multiple antennas is applied to expand the dimensions available for signal processing and detection. This technique acts mainly as a PHY layer for a performance boost. Another type of MIMO is multiuser (MU) MIMO (MU-MIMO). MU-MIMO techniques are radically different from SU-MIMO techniques, because the use of the channel is spatially shared by multiple users. In information theory, the MU-MIMO broadcast (BC) needs theoretical pre-interference cancellation techniques, such as dirty paper coding (DPC) combined with a user scheduling and power loading algorithm. However, this algorithm is categorized in non-linear precoding that requires more complex hardware to implement. To solve this issue, linear precoding algorithms, such as zero-forcing (ZF) and block diagonalization (BD) can be used. These can diminish hardware complexity issues but in some cases the interference is not fully cancelled.

However, the advantages above (e.g., both SU-MIMO and MU-MIMO) unfortunately come at a price. Especially in the MU-MIMO case, MIMO needs accurate CSI at the transmitter (CSIT) to properly serve the spatially multiplexed user. In the absence of CSIT, user multiplexing is generally not possible, as the AP does not know in which direction to form spatial beams. Thus, the complete lack of CSI reduces multiplexing gain. To solve this, midambles are used to estimate channel conditions more accurately, which boosts performance.

Figure 14:
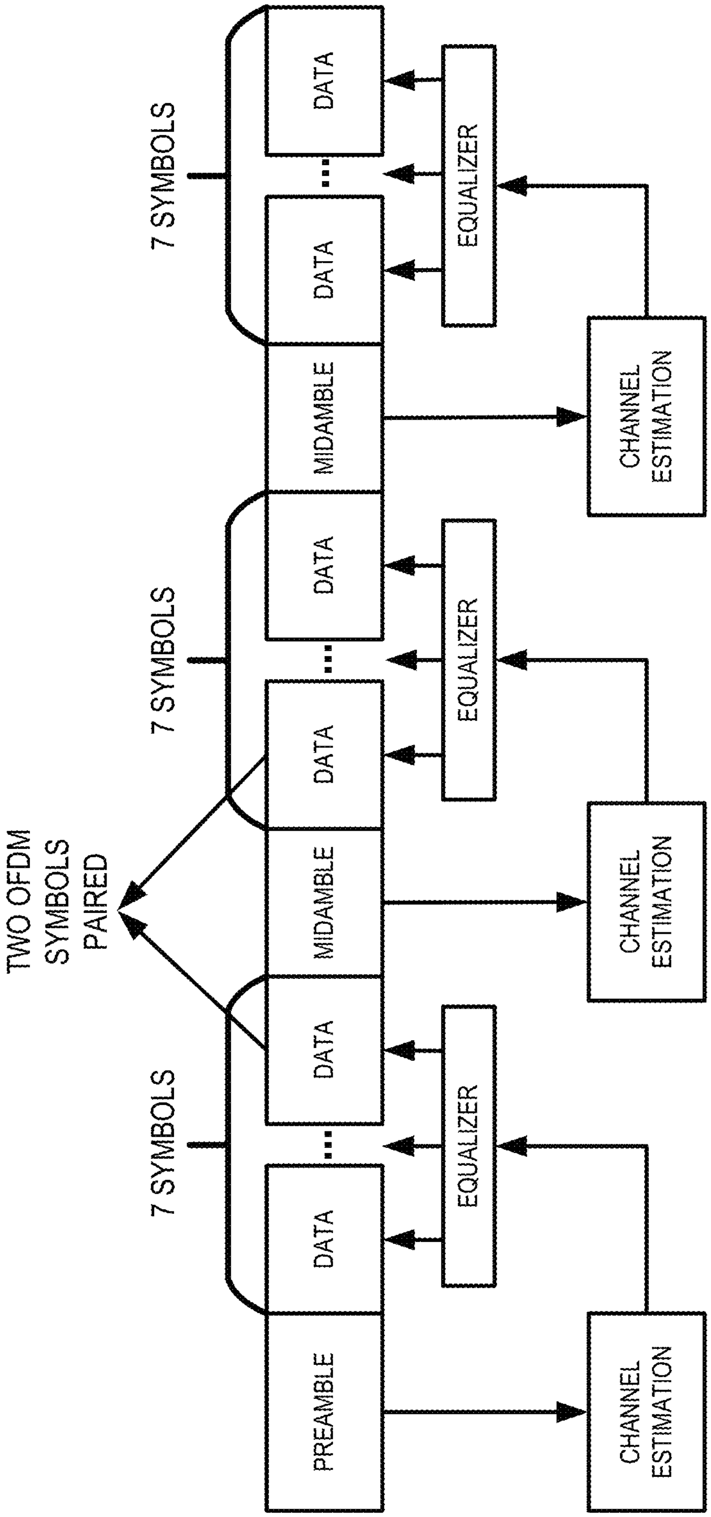
FIG. 14 shows two symbols where a midamble field located between the symbols are paired to be transmitted using a multiple input multiple output (MIMO) technique, in accordance with some embodiments of the present disclosure.

FIG. 14 shows two OFDM symbols, where the midamble field located between the OFDM symbols are paired to be transmitted using a MIMO technique. In this case, the system needs to wait to get a new channel information to decode paired two OFDM symbol together based on feedback and to secure two times bigger buffer size to store two different channel information together (e.g., LTFs in the preamble field and midamble field or LTFs in two separate midamble fields). Using different channel information from different corresponding midambles results in performance degradation.

In some embodiments, as noted above, the first information (i.e., midamble information/indication) could be implicitly indicated by second information. For example, when the second information indicates a first value, the first information could be implicitly indicated to be a first midamble period that is inserted/used in data portion of a PPDU/frame; when the second information indicates a second value, the first information could be implicitly indicated to be a second midamble period that is inserted/used in data portion of a PPDU/frame; and this pattern would continue up to when the second information indicates an Nth value such that the first information could be implicitly indicated to be an Nth midamble period that is inserted/used in data portion of a PPDU/frame. In some embodiments, the second information is a number of spatial streams in a PPDU. In these embodiments, when the first value is a lowest number of spatial streams (e.g., one) and the Nth value is the highest number of spatial stream allowed in the network or by the station (e.g., 2 or 16). In some embodiments, a midamble period of the second information is shorter than when using SISO.

In some embodiments, when the second information (i.e., the number of spatial streams) is set to 0 (i.e., one spatial stream), the first information (i.e., a midamble period) could be 4 for high MCSs or 8 for low MCSs while when the second information is set to 1 (i.e., two spatial streams), the first information could be 3 for high MCSs or 6 for low MCSs (relatively smaller than 4 or 8).

In some embodiments, when STBC is enabled and Doppler information is set to a first state to indicate the transmitted PPDU includes a midamble field a transmitter inserts a midamble field after every M data OFDM symbols of a PPDU to aid channel estimation for the following M data symbols. There are several options in this scenario. In a first example option, if a midamble period field indicates an odd period (e.g., 3, 5, or 7 OFDM symbols), similar to the example shown in FIG. 14 (e.g., one spatial stream with STBC), a midamble field is shifted to the location after two OFDM symbols are paired or before two OFDM symbols are paired for MIMO operation (e.g., STBC). However, if a midamble period field is an odd period (e.g. 3, 5, or 7 OFDM symbols) and STBC is not enabled, midamble fields keep the same location to be inserted/used.

In a second example option, if a midamble period field indicates a particular period, such as 2, and a spatial stream field indicates a particular number of spatial streams, such as 3 or 5, where the required number of space time streams is either 4 or 6, respectively, a midamble field is shifted to the location after the block of paired 4 or 6 OFDM symbols, respectively.

When receiving the PPDU, once a receiver decodes corresponding values (e.g., the number of spatial streams and/or STBC) in the PHY preamble of the PPDU correctly, the location and its midamble periodicity can be expected.

To increase transmission coverage, some fields in a PPDU may be power boosted. As for a legacy part of the PPDU, such as L-STF and L-LTF with low PAPR values supported, power boosting does not harm any power amp (PA) operation and it is transparent to the receiver that assumes good circumstances/environments for communication. As for L-SIG, it may not have good PAPR characteristics such that power boosting may not be a good idea. Repeated L-SIG could be appended to L-SIG to secure MRC gain.

In one embodiment, a PPDU includes first information to indicate power boosting to support lower sensitivity where coverage for the PPDU to be transmitted is increased. In one embodiment, the first information is a midamble indication (i.e., a midamble size or type indication), which also implicitly indicates power boosting. For example, if the first information is set to a first value (e.g., 0), no midamble is inserted/used in the PPDU and power boosting of the midamble is not applied (as there is no midamble). If the first information is set to a second value (e.g., 1), a midamble is inserted in the data portion of the PPDU and power boosting of the midamble is applied. In some embodiments, A dB power boosting could be applied, where A may be the value 3.

In some embodiments, when the first information is set to a first value (e.g., 0), no midamble is inserted/used in the PPDU and power boosting of the midamble is not applied (as there is no midamble) and power boosting of a LTF of the PPDU is applied (e.g., an NGV/EHT LTF). If the first information is set to a second value (e.g., 1), a midamble is inserted in the data portion of the PPDU and power boosting of the midamble is applied and power boosting of a LTF of the PPDU is applied (e.g., an NGV/EHT LTF). In some embodiments, A dB power boosting could be applied to the midamble and/or LTF fields, where A may be the value 3.

In one embodiment, when an extended range PPDU is transmitted (e.g., a PPDU with power-boosted fields in the PPDU), a repeated L-SIG (RL-SIG) includes different constellation mapping compared with the L-SIG. In one embodiment, RL-SIG is QBPSK modulated. In one embodiment, L-SIG is BPSK modulated. In one embodiment, L-SIG and RL-SIG are 1/2 rate modulated.

In one embodiment, when an extended range PPDU is transmitted (e.g., a PPDU with power-boosted fields in the PPDU), a preamble portion of the PPDU is power-boosted or repeated. In this embodiment, the preamble portion of the PPDU includes a SIG field, an STF field, and/or an LTF field. Further, a repeated SIG field could be appended to the SIG field. In one embodiment, the repeated SIG field could include a different constellation mapping compared to the SIG field. In one embodiment, the repeated SIG field is QBPSK constellation modulated. In one embodiment, the SIG field is BPSK constellation modulated. In one embodiment, the STF field of the PPDU is A dB power-boosted and the LTF field of the PPDU is B dB power-boosted. In some embodiments, A is 3 and B is 3.

In any of the description provided herein, the PPDUs/frames may be wireless PPDUs/frames that are part of a wireless standard (e.g., IEEE 802.11bc and/or 802.11bd).

Figure 15:
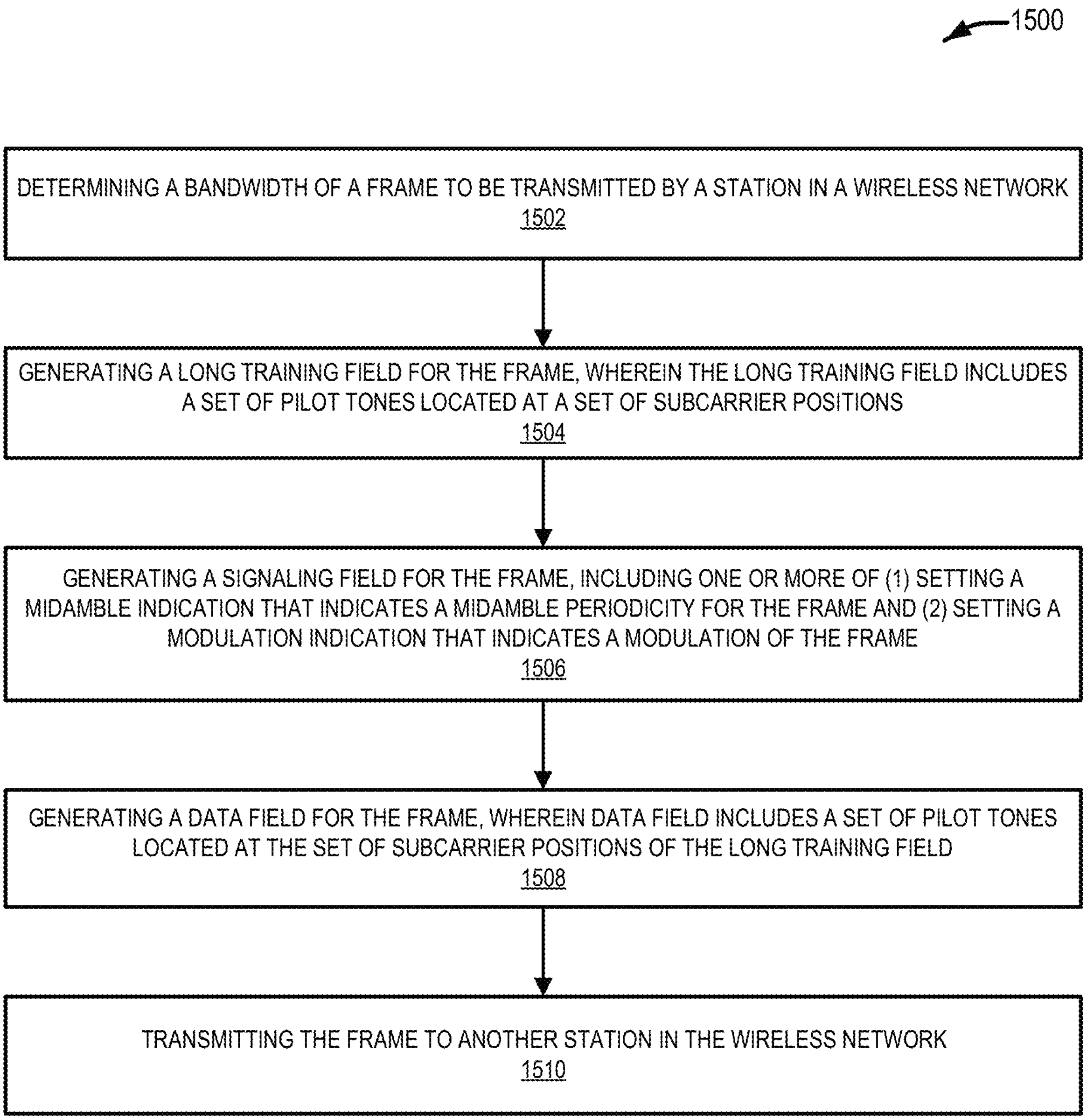
FIG. 15 shows a method for generating and transmitting a frame, in accordance with an example embodiment.

Turning to FIG. 15, a method 1500 will be described for generating and transmitting a frame. The method 1500 may be performed by a station in a wireless network. In some embodiments, the method 1500 may be performed in relation to one or more of the details described in other portions of the description. Although described and shown in a particular order, in other embodiments one or more of the operations of the method 1500 may be performed in a different order, including in partially or entirely overlapping time periods.

As shown in FIG. 15, the method 1500 commences at operation 1502 with a station determining a bandwidth of the frame to be transmitted by the station to another station in a wireless network. In one embodiment, the frame is a PPDU that will be transmitted to another station in a wireless network (e.g., a non-AP station or an AP). In one embodiment, the station determines the bandwidth of the frame is one of 10 MHz, 20 MHz, 40 MHz, 80 MHz, 80+80 MHz, 160 MHz, 320 MHz, or 160+160 MHz.

At operation 1504, the station generates a long training field for the frame. In one embodiment, the long training field includes a set of pilot tones located at a set of subcarrier positions. In one embodiment, when the bandwidth of the frame is 10 MHz, the set of subcarrier positions include four subcarrier positions and the four subcarrier positions are set as $\{-21-\alpha 1, -7-\alpha 2, 7+\alpha 3, 21+\alpha 4\}$, where $\alpha 1$, $\alpha 2$, $\alpha 3$, and $\alpha 4$ are odd values. In one embodiment, the values $\alpha 1$, $\alpha 2$, $\alpha 3$, and $\alpha 4$ are identical. In one embodiment, the values $\alpha 1$, $\alpha 2$, $\alpha 3$, and $\alpha 4$ are each equal to one, three, or five.

In one embodiment, when the bandwidth of the frame is 20 MHz, the set of subcarrier positions include more than four subcarrier positions, including $\{-53-\beta 1, -25-\beta 2, -11-\beta 3, 11+\beta 4, 25+\beta 5, 53+\beta 6\}$, where $\beta 1$, $\beta 2$, $\beta 3$, $\beta 4$, 35 and $\beta 6$ are odd values. In one embodiment, the values $\beta 1$, $\beta 2$, $\beta 3$, $\beta 4$, 35 and $\beta 6$ are identical. In one embodiment, the values $\beta 1$, $\beta 2$, $\beta 3$, $\beta 4$, 5 and $\beta 6$ are each equal to one, three, or five.

The sequence and/or type of sequence used for the long training field can be selected based on the type of modulation and coding and/or a type of the frame. For example, when the frame is an extended range frame (e.g., a frame with boosted fields in the preamble), the sequence used for the long training field may be a repeated sequence (e.g., a repeated 2×LTF sequence or type of LTF).

At operation 1506, the station generates a signaling field for the frame. In one embodiment, generating the signaling field includes setting a midamble indication that indicates a midamble periodicity for the frame. Accordingly, the frame includes the signaling field, including the midamble indication. In one embodiment, when the midamble indication has a first value a midamble is inserted in a data field of the frame after four data symbols. In one embodiment, when the midamble indication has a second value a midamble is inserted in a data field of the frame after eight data symbols.

In some embodiments, generating the signaling field includes setting a modulation indication that indicates a modulation for the frame. Accordingly, the frame includes the signaling field, including the modulation indication. In one embodiment, the modulation indication indicates a type of long training field sequence and the modulation for the frame. For example, the modulation indication implicitly indicates a type of long training field sequence to use in the long training field. In one embodiment, the modulation indication indicates use of a repeated compressed long training field sequence based on use of one or more of dual carrier modulation and binary phase shift keying.

In some embodiments, the midamble indication and the modulation indication may be in the same or different signaling fields of the frame. In some embodiments, only one of the modulation indication and the midamble indication are present in the frame.

At operation 1508, the station generates a data field for the frame, including one or more data symbols and, in some cases, one or more midambles. In one embodiment, the data field includes a set of pilot tones located at a set of subcarrier positions. In one embodiment, the set of subcarrier positions are the same as the set of subcarrier positions used for the long training field. For example, in one embodiment, when the bandwidth of the frame is 10 MHz, the set of subcarrier positions of the data field include four subcarrier positions and the four subcarrier positions are set as $\{-21-\alpha 1, -7-\alpha 2, 7+\alpha 3, 21+\alpha 4\}$, where $\alpha 1$, $\alpha 2$, $\alpha 3$, and $\alpha 4$ are odd values. In one embodiment, the values $\alpha 1$, $\alpha 2$, $\alpha 3$, and $\alpha 4$ are identical. In one embodiment, the values $\alpha 1$, $\alpha 2$, $\alpha 3$, and $\alpha 4$ are each equal to one, three, or five.

In one embodiment, when the bandwidth of the frame is 20 MHz, the set of subcarrier positions of the data field include six subcarrier positions, including $\{-53-\beta 1, -25-\beta 2, -11-\beta 3, 11+\beta 4, 25+5, 53+\beta 6\}$, where $\beta 1$, $\beta 2$, $\beta 3$, $\beta 4$, $\beta 5$ and $\beta 6$ are odd values. In one embodiment, the values $\beta 1$, $\beta 2$, $\beta 3$, $\beta 4$, 35 and $\beta 6$ are identical. In one embodiment, the values $\beta 1$, $\beta 2$, $\beta 3$, $\beta 4$, $\beta 5$ and $\beta 6$ are each equal to one, three, or five.

At operation 1510, the station transmits the frame to another station in the wireless network.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a station (STA) operating in a wireless network, the method comprising:

determining a bandwidth of a frame to be transmitted by the STA;

generating a long training field for the frame, the long training field including a set of pilot tones located at a set of subcarrier positions, wherein in response to the bandwidth of the frame is 10 MHz, the set of subcarrier positions includes four subcarrier positions, wherein the four subcarrier positions are set as $\{-21-\alpha1,-7-\alpha2,7+\alpha3,21+\alpha4\}$, wherein $\alpha1$, $\alpha2$, $\alpha3$, and $\alpha4$ are equal to a value of 1, and wherein in response to the bandwidth of the frame is 20 MHz, the set of subcarrier positions includes six subcarrier positions, wherein the six subcarrier positions are set as $\{-53-\beta1, -25-\beta2,-11-\beta3,11+\beta4, 25+\beta5,53+\beta6\}$, wherein $\beta1$, $\beta2$, $\beta3$, $\beta4$, $\beta5$, and $\beta6$ are equal to a value of 1; and transmitting the frame with the long training field to a recipient.

2. The method of claim 1, wherein the values $\alpha1$, $\alpha2$, $\alpha3$, and $\alpha4$ are identical values.

3. The method of claim 1, wherein the values $\alpha1$, $\alpha2$, $\alpha3$, and $\alpha4$ are each equal to one, three, or five.

4. The method of claim 1, wherein the values $\beta1$, $\beta2$, $\beta3$, $\beta4$, $\beta5$ and $\beta6$ are identical values.

5. The method of claim 1, wherein the values $\beta1$, $\beta2$, $\beta3$, $\beta4$, $\beta5$ and $\beta6$ are each equal to one, three, or five.

6. The method of claim 1, wherein a sequence and or a type of sequence used for the long training field are selected based on a type of modulation and coding and or a type of the frame.

7. The method of claim 1, further comprising:

generating a signaling field for the frame by setting a midamble indication that indicates a midamble periodicity for the frame, wherein the frame includes the signaling field and the signaling field includes a modulation indication.

8. The method of claim 7, wherein in response to the midamble indication includes a first value, a midamble is inserted in a data field of the frame after four data symbols.

9. The method of claim 8, wherein in response to the midamble indication includes a second value, a midamble is inserted in the data field of the frame after eight data symbols.

10. The method of claim 1, further comprising:

generating a signaling field for the frame by setting a modulation indication indicating a modulation for the frame, the frame including the signaling field and the signaling field including the modulation indication.

11. The method of claim 10, wherein the modulation indication indicates a type of long training field sequence and the modulation for the frame.

12. The method of claim 10, wherein the modulation indication indicates use of a repeated compressed long training field sequence based on use of one or more of a dual carrier modulation and a binary phase shift keying.

13. The method of claim 1, wherein only one of a midamble indication and a modulation indication are present in the frame.

14. The method of claim 1, further comprising:

generating a data field for the frame, the frame including one or more data symbols and one or more midambles.

15. The method of claim 14, wherein the data field includes a set of pilot tones located at a set of subcarrier positions, wherein the set of subcarrier positions are the same as the set of subcarrier positions used for the long training field.

16. A station (STA) configured to operate in a wireless network, the station comprising:

a memory device storing a set of instructions; and a processor coupled to the memory device, wherein the set of instructions when executed by the processor cause the STA to:

determine a bandwidth of a frame to be transmitted by the station;

generate a long training field for the frame, wherein the long training field includes a set of pilot tones located at a set of subcarrier positions, wherein in response to the bandwidth of the frame is 10 MHz, the set of subcarrier positions includes four subcarrier positions, wherein the four subcarrier positions are set as {−21−α1,−7−α2,7+α3,21+α4}, wherein α1, α2, α3, and α4 are equal to a value of 1, and wherein in response to the bandwidth of the frame is 20 MHz, the set of subcarrier positions includes six subcarrier positions, wherein the six subcarrier positions are set as {−53−β1,−25−β2, −11−β3,11+β4,25+β5,53+β6}, wherein β1, β2, β3, β4, β5, and β6 are equal to a value of 1; and transmit the frame with the long training field to a recipient.

17. The STA of claim 16, wherein the values α1, α2, α3, and α4 are identical values.

18. The STA of claim 16, wherein the values α1, α2, α3, and α4 are each equal to one, three, or five.

19. The STA of claim 16, wherein the values β1, β2, β3, β4, β5 and β6 are identical values.

20. The STA of claim 16, wherein the values β1, β2, β3, β4, β5 and β6 are each equal to one, three, or five.

21. The STA of claim 16, wherein a sequence and or a type of sequence used for the long training field are selected based on a type of modulation and coding and or a type of the frame.

22. The STA of claim 16, further comprising:

generating a signaling field for the frame by setting a midamble indication that indicates a midamble periodicity for the frame, wherein the frame includes the signaling field and the signaling field includes a modulation indication.

23. The STA of claim 22, wherein in response to the midamble indication includes a first value, a midamble is inserted in a data field of the frame after four data symbols.

24. The STA of claim 23, wherein in response to the midamble indication includes a second value, a midamble is inserted in the data field of the frame after eight data symbols.

25. The STA of claim 16, further comprising:

generating a signaling field for the frame by setting a modulation indication indicating a modulation for the frame, the frame including the signaling field and the signaling field including the modulation indication.

26. The STA of claim 25, wherein the modulation indication indicates a type of long training field sequence and the modulation for the frame.

27. The STA of claim 25, wherein the modulation indication indicates use of a repeated compressed long training field sequence based on use of one or more of a dual carrier modulation and a binary phase shift keying.

28. The STA of claim 16, wherein only one of a midamble indication and a modulation indication are present in the frame.

29. The STA of claim 16, further comprising:

generating a data field for the frame, the frame including one or more data symbols and one or more midambles.

30. The STA of claim 29, wherein the data field includes a set of pilot tones located at a set of subcarrier positions, wherein the set of subcarrier positions are the same as the set of subcarrier positions used for the long training field.

31. A non-transitory machine readable medium that stores instructions, which when executed by a processor of a station (STA), causes the STA to perform:

determining a bandwidth of a frame to be transmitted by the STA;

generating a long training field for the frame, the long training field including a set of pilot tones located at a set of subcarrier positions, wherein in response to the bandwidth of the frame is 10 MHz, the set of subcarrier positions includes four subcarrier positions, wherein the four subcarrier positions are set as {−21−α1,−7−α2,7+α3,21+α4}, wherein α1, α2, α3, and α4 are equal to a value of 1, and wherein in response to the bandwidth of the frame is 20 MHz, the set of subcarrier positions includes six subcarrier positions, wherein the six subcarrier positions are set as {−53−β1,−25−β2, −11−β3,11+β4,25+β5,53+β6}, wherein β1, β2, β3, β4, β5, and β6 are equal to a value of 1; and transmitting the frame with the long training field to a recipient.

32. The non-transitory machine readable medium of claim 31, wherein the values α1, α2, α3, and α4 are identical values.

33. The non-transitory machine readable medium of claim 31, wherein the values α1, α2, α3, and α4 are each equal to one, three, or five.

34. The non-transitory machine readable medium of claim 31, wherein the values β1, β2, β3, β4, β5 and β6 are identical values.

35. The non-transitory machine readable medium of claim 31, wherein the values β1, β2, β3, β4, β5 and β6 are each equal to one, three, or five.

36. The non-transitory machine readable medium of claim 31, wherein a sequence and or a type of sequence used for the long training field are selected based on a type of modulation and coding and or a type of the frame.

37. The non-transitory machine readable medium of claim 31, wherein the instructions further cause the STA to perform:

generating a signaling field for the frame by setting a midamble indication that indicates a midamble periodicity for the frame, wherein the frame includes the signaling field and the signaling field includes a modulation indication.

38. The non-transitory machine readable medium of claim 37, wherein in response to the midamble indication includes a first value, a midamble is inserted in a data field of the frame after four data symbols.

39. The non-transitory machine readable medium of claim 38, wherein in response to the midamble indication includes a second value, a midamble is inserted in the data field of the frame after eight data symbols.

40. The non-transitory machine readable medium of claim 31, wherein the instructions further cause the STA to perform:

generating a signaling field for the frame by setting a modulation indication indicating a modulation for the frame, the frame including the signaling field and the signaling field including the modulation indication.

41. The non-transitory machine readable medium of claim 40, wherein the modulation indication indicates a type of long training field sequence and the modulation for the frame.

42. The non-transitory machine readable medium of claim 40, wherein the modulation indication indicates use of a repeated compressed long training field sequence based on use of one or more of a dual carrier modulation and a binary phase shift keying.

43. The non-transitory machine readable medium of claim 31, wherein only one of a midamble indication and a modulation indication are present in the frame.

44. The non-transitory machine readable medium of claim 31, further comprising:

generating a data field for the frame, the frame including one or more data symbols and one or more midambles.

45. The non-transitory machine readable medium of claim 44, wherein the data field includes a set of pilot tones located at a set of subcarrier positions, wherein the set of subcarrier positions are the same as the set of subcarrier positions used for the long training field.

* * * * *